United States Patent
Yu

(10) Patent No.: US 12,452,206 B2
(45) Date of Patent: Oct. 21, 2025

(54) ADDRESS ASSIGNMENT METHOD, NODE DETERMINING METHOD AND APPARATUS, AND STORAGE MEDIUM

(71) Applicant: Huawei Technologies Co., Ltd., Shenzhen (CN)

(72) Inventor: Delei Yu, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 29 days.

(21) Appl. No.: 18/405,265

(22) Filed: Jan. 5, 2024

(65) Prior Publication Data
US 2024/0205185 A1 Jun. 20, 2024

Related U.S. Application Data

(63) Continuation of application No. PCT/CN2022/091793, filed on May 9, 2022.

(30) Foreign Application Priority Data

Jul. 6, 2021 (CN) .......................... 202110763620.0

(51) Int. Cl.
*H04L 61/50* (2022.01)
(52) U.S. Cl.
CPC ................................. *H04L 61/50* (2022.05)
(58) Field of Classification Search
None
See application file for complete search history.

(56) References Cited

U.S. PATENT DOCUMENTS

| 5,113,523 | A | * | 5/1992 | Colley | G06F 15/17343 |
| | | | | | 712/12 |
| 5,367,636 | A | * | 11/1994 | Colley | G06F 15/17343 |
| | | | | | 709/245 |
| 11,368,393 | B2 | * | 6/2022 | Vedantham | H04L 61/5007 |
| 2003/0156093 | A1 | * | 8/2003 | Niida | H04L 49/90 |
| | | | | | 345/156 |
| 2006/0221921 | A1 | * | 10/2006 | Kniveton | H04L 61/50 |
| | | | | | 370/400 |

(Continued)

FOREIGN PATENT DOCUMENTS

| CN | 101815287 A | 8/2010 |
| CN | 103338274 A | 10/2013 |

(Continued)

OTHER PUBLICATIONS

Hickman, C., et al., "A Variable Length Address Assignment Scheme for 6LoWPAN," 2019 IEEE 20th International Symposium on a World of Wireless, Mobile and Multimedia Networks (WOWMOM), XP33594850A, Jun. 10, 2019, 6 pages.

(Continued)

*Primary Examiner* — Phyllis A Book
(74) *Attorney, Agent, or Firm* — Conley Rose, P.C.

(57) ABSTRACT

A method includes: a first node obtains an address of a second node based on an address of the first node, where the address of the first node includes m bits, where the address of the second node includes m+n bits, where high-order m bits of the address of the second node are the same as low-order m bits of the address of the first node, and where m and n each are an integer greater than 0; and the first node sends the address of the second node to the second node.

24 Claims, 6 Drawing Sheets

(56) References Cited

U.S. PATENT DOCUMENTS

| | | | |
|---|---|---|---|
| 2006/0235982 A1* | 10/2006 | Koshino | H04N 21/6125 |
| | | | 709/227 |
| 2006/0271706 A1* | 11/2006 | Dugan | H04L 61/5038 |
| | | | 370/395.3 |
| 2016/0087936 A1 | 3/2016 | Akyurek et al. | |
| 2016/0283399 A1* | 9/2016 | Das Sharma | G06F 13/4282 |
| 2017/0195282 A1* | 7/2017 | Teng | H04L 61/5061 |
| 2022/0382813 A1* | 12/2022 | Benisty | G06F 16/9027 |
| 2022/0391449 A1* | 12/2022 | Benisty | G06F 16/9027 |

FOREIGN PATENT DOCUMENTS

| | | | | |
|---|---|---|---|---|
| EP | 4177760 A2 * | 5/2023 | | G06F 12/0692 |
| GB | 2415855 A * | 1/2006 | | H04L 29/12254 |

OTHER PUBLICATIONS

IEEE Std 802.15.4, IPart 15.4: Wireless Medium Access Control (MAC) and Physical Layer (PHY) Specifications for Low-Rate Wireless, Personal Area Networks (WPANs), EEE Computer Society, Sep. 8, 2006, total 323 pages.

Uttam Kumar Roy:"Extending ZigBee Tree Routing Protocol for Resource-Constrained Devices." Augustus 2014. total 6 pages.

Zigbee alliance, zigbee Specification Revision 22 1.0, zigbee Document 05-3474-22, Apr. 19, 2017, total 599 pages.

* cited by examiner

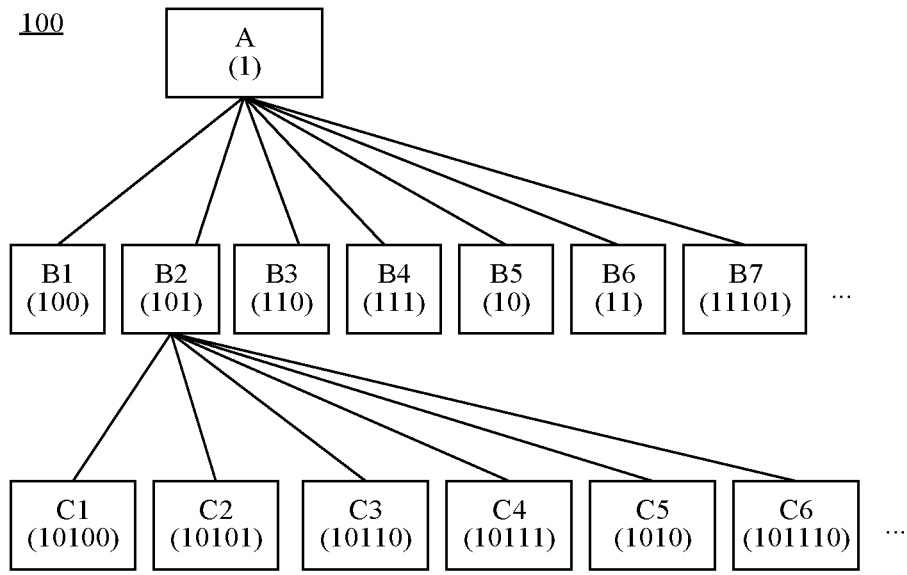

201 — A first node receives an address assignment request sent by a second node, where the second node is a subnode of the first node 202 — The first node obtains a second address, where the second address includes n bits, and n is an integer greater than 0

203 — The first node obtains an address of the second node based on a third address and the second address, where the third address is an address of a parent node of the second node 204 — The first node sends an address assignment response to the second node, where the address assignment response includes the address of the second node

401 — A first node receives an address assignment request sent by a second node, where the second node is a subnode of the first node 402 — The first node obtains a second address, where the second address includes n bits, and n is an integer greater than 0

403 — The first node obtains an address of the second node based on a third address and the second address, where the third address is an address of a parent node of the second node 404 — The first node sends an address assignment response to the second node, where the address assignment response includes the address of the second node

FIG. 4

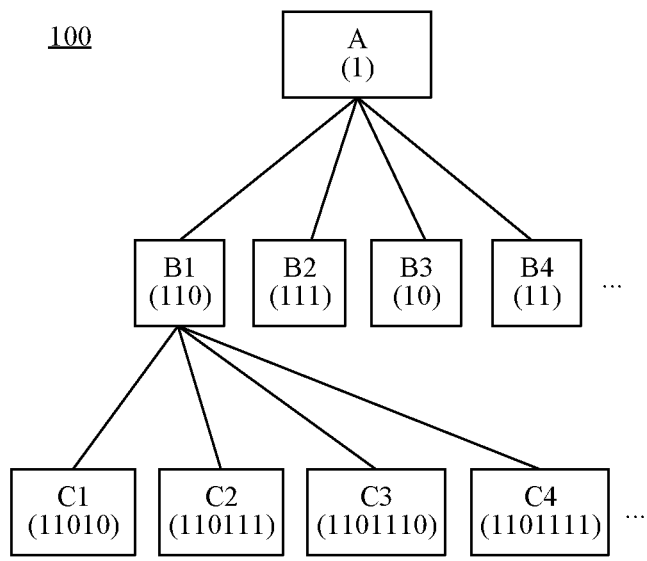

FIG. 5

ADDRESS ASSIGNMENT METHOD, NODE DETERMINING METHOD AND APPARATUS, AND STORAGE MEDIUM

CROSS-REFERENCE TO RELATED APPLICATIONS

This is a continuation of International Patent Application No. PCT/CN2022/091793 filed on May 9, 2022, which claims priority to Chinese Patent Application No. 202110763620.0 filed on Jul. 6, 2021. The disclosures of the aforementioned applications are hereby incorporated by reference in their entireties.

TECHNICAL FIELD

This disclosure relates to the communications field, and in particular, to an address assignment method, a node determining method and apparatus, and a storage medium.

BACKGROUND

An address is an identifier of a node. When the node accesses a network, the node needs to request to be assigned an address, and then the node uses the address to communicate with another node. For example, when the node sends a message to another node, a source address of the message is an address of the node. When the other node receives the message, and returns a response message to the node, a destination address of the response message is the address of the node.

To assign an address, currently, a server is disposed, where the server includes an address pool, and the address pool includes a plurality of addresses. When the node accesses the network, the node sends an address assignment request to the server. The server receives the address assignment request, selects one address from the address pool as the address of the node, and returns an address assignment response to the node, where the address assignment response includes the address of the node. The node receives the address assignment response, and obtains the address of the node from the address assignment response.

Some other technologies have at least the following problems:

Each node in the network requests a server to assign an address, and one server needs to be separately disposed, leading to high assignment costs. When the node is far away from the server, the address assignment request and the address assignment response are forwarded through a plurality of hops, also consuming relatively large network resources.

SUMMARY

This disclosure provides an address assignment method, a node determining method and apparatus, and a storage medium, to reduce address assignment costs and reduce consumption of network resources. The technical solutions are as follows:

According to a first aspect, this disclosure provides an address assignment method. In the method, a first node obtains an address of a second node based on an address of the first node, where the address of the first node includes m bits, the address of the second node includes m+n bits, high-order m bits of the address of the second node are the same as low-order m bits of the address of the first node, and m and n each are an integer greater than 0. The first node sends the address of the second node to the second node.

Because the address of the first node includes the m bits, the address of the second node includes the m+n bits, and the high-order m bits of the address of the second node are the same as the low-order m bits of the address of the first node, the first node uses the address of the first node as high-order bits when assigning an address, and adds low-order n bits on this basis, to obtain the address of the second node. In this way, the second node may be a subnode of the first node, and the first node assigns an address to the subnode of the first node. Therefore, the address assignment function is distributed on different non-leaf nodes in a network, and a server dedicated to address assignment does not need to be separately disposed, thereby reducing address assignment costs. In addition, a distance between the subnode of the first node and the first node is usually relatively short. In this way, network resources consumed during address assignment can be reduced.

Currently, when a server assigns addresses in a unified manner, the server is under relatively heavy pressure, affecting address assignment efficiency. However, in this disclosure, because the first node is responsible for assigning the address to the subnode of the first node, the address assignment function is distributed on the different non-leaf nodes. In this way, the address is quickly assigned. Because the assigned address includes the m+n bits, and the high-order m bits of the address are the same as the low-order m bits of the address of the first node, the assigned address is short and flexible, and bit efficiency of the address is high.

In a possible implementation, the second node can assign an address if the low-order n bits of the address of the second node meet a condition for allowing a node to assign an address. The second node cannot assign an address if the low-order n bits of the address of the second node meet a condition for prohibiting a node from assigning an address. In this way, it can be ensured that a subnode accesses a non-leaf node in the network, and the subnode is prevented from accessing a leaf node in the network.

In another possible implementation, the condition for allowing a node to assign an address includes a first condition and/or a second condition. The second node can assign an address if first p bits of low-order n bits of the address of the second node meet the first condition, where p is an integer greater than 0; or the second node can assign an address if first n−1 bits and a last bit of the low-order n bits of the address of the second node meet the second condition. In this way, the low-order n bits are used to ensure that a non-leaf node can assign an address, so that a subnode accesses the non-leaf node in the network.

In another possible implementation, the first condition is that n=p and p is a specified integer, and the second condition is that values of the first n−1 bits are all 1 and a value of the last bit is 0.

In another possible implementation, the condition for prohibiting a node from assigning an address includes a third condition, a fourth condition, and/or a fifth condition. The second node cannot assign an address if first p bits of the low-order n bits of the address of the second node meet the third condition; the second node cannot assign an address if a length of the low-order n bits of the address of the second node meets the fourth condition; or the second node cannot assign an address if first n−1 bits and a last bit of the low-order n bits of the address of the second node meet the fifth condition. In this way, the low-order n bits can be used to ensure that a leaf node cannot assign an address, thereby preventing a subnode from accessing the leaf node in the network.

In another possible implementation, the third condition is that n is greater than p, p is a specified integer, and the first p bits are a specified address, the fourth condition is that the length of the low-order n bits of the address of the second node is less than a specified integer p, and the fifth condition is that values of the first n−1 bits are all 1 and a value of the last bit is 1.

In another possible implementation, the first node sends a first message to the second node, where the first message includes a field whose length is equal to x bytes, the field carries the address of the second node, and x is an integer greater than 0. Currently, the byte is used as a storage unit, and the length of the field is x bytes. This facilitates storage of the address of the second node in the first message.

In another possible implementation, the first node selects one idle address from a first address pool as the low-order n bits of the address of the second node, the first node includes the first address pool, a quantity of bits included in each address in the first address pool is equal to p, p is a specified integer greater than 0, and n=p.

In another possible implementation, the first node selects one idle address from the first address pool as the low-order n bits of the address of the second node when a type of the second node is a non-leaf node. Because a length of each address in the first address pool is p, and the address is selected from the first address pool as the low-order n bits of the second node when the type of the second node is a non-leaf node, the low-order n bits are used to ensure that the non-leaf node can assign an address, so that a subnode accesses the non-leaf node in the network.

In another possible implementation, the first node selects one idle address from a second address pool as the low-order n bits of the address of the second node when the first address pool does not include the idle address, where the first node includes the second address pool, the second address pool includes a first-type address and/or a second-type address, a quantity of bits included in the first-type address is less than p, a quantity of bits included in the second-type address is greater than p, and first p bits of the second-type address are a specified address in the first address pool. There are a relatively large quantity of addresses in the second address pool. In this way, the first node also assigns different addresses to different subnodes when there are a relatively large quantity of subnodes accessing the first node.

In another possible implementation, the first node selects one idle address from a second address pool as the low-order n bits of the address of the second node when a type of the second node is a leaf node, where the second address pool includes a first-type address and/or a second-type address, a quantity of bits included in the first-type address is less than p, a quantity of bits included in the second-type address is greater than p, first p bits of the second-type address are a specified address, and p is a specified integer greater than 0. In this way, the low-order n bits can be used to ensure that the leaf node cannot assign an address, thereby preventing a subnode from accessing the leaf node in the network.

In another possible implementation, the first node is a parent node of the second node. In this way, when the second node requests to assign an address, the request needs to be sent through only one hop, thereby reducing consumption of network resources.

In another possible implementation, the first node requests to assign a first address, where the first address is the address of the first node.

In another possible implementation, the first node updates high-order m bits of an address of each node in a node set to the first address, where the node set includes the subnode of the first node. In this way, even if the first node does not access the network, the first node may assign an address to the subnode of the first node. After the first node accesses the network, the first node updates the high-order m bits of the address of each subnode of the first node to the first address, to ensure correctness of the address of each subnode.

According to a second aspect, this disclosure provides a node determining method. In the method, a first node receives a first message, where the first message includes a destination address, the destination address includes x bits, and x is an integer greater than 0. The first node determines a next-hop node of the first message based on an address of the first node and the destination address, where the address of the first node includes y bits, and y is an integer greater than 0.

Because the first node determines the next-hop node of the first message based on the address of the first node and the destination address, a supported format of the destination address is as follows: high-order m bits of the destination address are an address of a parent node of a second node corresponding to the destination address, and m is an integer greater than 0 and less than x. The destination address in this format is assigned by a node that the second node requests to access. In this way, the address assignment function is distributed on different non-leaf nodes in the network, and a server dedicated to address assignment does not need to be separately disposed, thereby reducing address assignment costs. In addition, a distance between the second node and the node accessed by the second node is usually relatively short. In this way, network resources consumed during address assignment can be reduced.

In a possible implementation, the first node determines, when x is less than y, that the next-hop node of the first message is a parent node of the first node. In this way, when it is determined that x is less than y, the first message may be sent to a parent node of the first node, to improve forwarding efficiency of the first message.

In another possible implementation, the first node determines the next-hop node of the first message based on the address of the first node and a first address when x is greater than or equal to y, where the first address is high-order y bits of the destination address. Because the first address is the high-order y bits of the destination address, the first node can ensure correctness of determining the next-hop node based on the address of the first node and the first address, thereby avoiding a forwarding error.

In another possible implementation, the first node determines, when the address of the first node is different from the first address, that the next-hop node of the first message is the parent node of the first node. In this way, when it is determined that the address of the first node is different from the first address, the first message may be sent to the parent node of the first node, thereby improving forwarding efficiency of the first message.

In another possible implementation, the first node determines the next-hop node of the first message based on a second address when the address of the first node is the same as the first address and x is greater than y, where the second address is a part of the destination address other than the first address. This can ensure correctness of determining the next-hop node, and avoid a forwarding error.

In another possible implementation, when a quantity of bits included in the second address is less than or equal to p or first p bits of the second address are a specified address, a node corresponding to the destination address is a child node of the first node; and the first node determines that the next-hop node of the first message is the child node corresponding to the destination address, where p is a specified integer greater than 0.

In another possible implementation, when a quantity of bits included in the second address is greater than p and first p bits of the second address are not a specified address, the first node determines that the next-hop node of the first message is a node corresponding to a third address, where the third address includes the first address and the first p bits of the second address.

In another possible implementation, when a value of each bit included in the second address is 1, or when a value of a least significant bit in the second address is 0 and a value of each of other bits other than the least significant bit in the second address is 1, a node corresponding to the destination address is a child node of the first node; and the first node determines that the next-hop node of the first message is the child node corresponding to the destination address.

In another possible implementation, the first node obtains a fourth address when a bit whose value is 0 exists in other bits other than the least significant bit in the second address, where the fourth address is first z bits of the second address, z is an integer greater than 0, a value of a least significant bit of the fourth address is 0, and values of the first z−1 bits of the fourth address are all 1. The first node determines that the next-hop node of the first message is a node corresponding to a third address, where the third address includes the first address and the fourth address.

In another possible implementation, the first node processes the first message when the address of the first node is the same as the first address and x=y.

In another possible implementation, the high-order m bits of the destination address are the same as the address of the parent node of the second node, the second node is a node corresponding to the destination address, and m is an integer greater than 0 and less than x. Because the high-order m bits of the destination address are the address of the parent node of the second node, the destination address in this format is assigned by the node that the second node requests to access. In this way, the address assignment function is distributed on different non-leaf nodes in the network, and a server dedicated to address assignment does not need to be separately disposed, thereby reducing address assignment costs. In addition, a distance between the second node and the node accessed by the second node is usually relatively short. In this way, network resources consumed during address assignment can be reduced.

In another possible implementation, the destination address in any one of the second aspect or the possible implementations of the second aspect is assigned by using the method according to any one of the first aspect or the possible implementations of the first aspect.

According to a third aspect, this disclosure provides an address assignment apparatus, configured to perform the method performed by the first node in any one of the first aspect or the possible implementations of the first aspect. The apparatus includes units configured to perform the method performed by the first node in any one of the first aspect or the possible implementations of the first aspect.

According to a fourth aspect, this disclosure provides a node determining apparatus, configured to perform the method performed by the first node in any one of the second aspect or the possible implementations of the second aspect. The apparatus includes units configured to perform the method performed by the first node in any one of the second aspect or the possible implementations of the second aspect.

According to a fifth aspect, this disclosure provides an address assignment apparatus. The apparatus includes a transceiver, a processor, and a memory. The transceiver, the processor, and the memory may be connected through an internal connection. The memory is configured to store a program, and the processor is configured to execute the program in the memory and cooperate with the transceiver, to enable the apparatus to complete the method performed by the first node in any one of the first aspect or the possible implementations of the first aspect.

According to a sixth aspect, this disclosure provides a node determining apparatus, where the apparatus includes a transceiver, a processor, and a memory. The transceiver, the processor, and the memory may be connected through an internal connection. The memory is configured to store a program, and the processor is configured to execute the program in the memory and cooperate with the transceiver, to enable the apparatus to complete the method performed by the first node in any one of the second aspect or the possible implementations of the second aspect.

According to a seventh aspect, this disclosure provides a computer program product. The computer program product includes a computer program stored in a computer-readable storage medium, and the computing program is loaded by a processor to implement instructions of the method performed by the first node in any one of the first aspect, the second aspect, the possible implementations of the first aspect, or the possible implementations of the second aspect.

According to an eighth aspect, this disclosure provides a computer-readable storage medium, configured to store a computer program. The computer program is loaded by a processor to execute instructions of the method performed by the first node in any one of the first aspect, the second aspect, the possible implementations of the first aspect, or the possible implementations of the second aspect.

BRIEF DESCRIPTION OF DRAWINGS

FIG. 1 is a schematic diagram of a network architecture according to an embodiment of this disclosure.

FIG. 2 is a flowchart of an address assignment method according to an embodiment of this disclosure.

FIG. 4 is a flowchart of another address assignment method according to an embodiment of this disclosure.

FIG. 5 is a schematic diagram of still another network architecture according to an embodiment of this disclosure.

DESCRIPTION OF EMBODIMENTS

Figure 3:
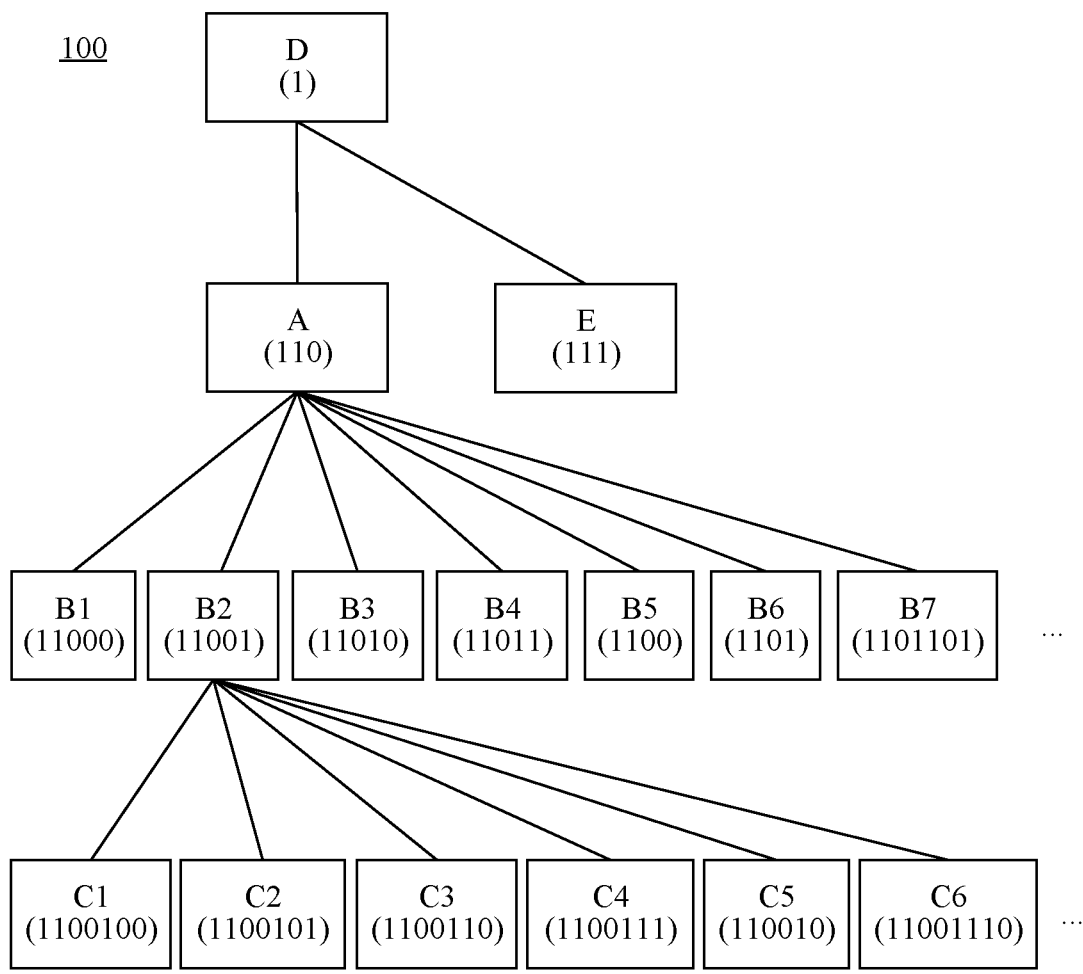
FIG. 3 is a schematic diagram of another network architecture according to an embodiment of this disclosure.

The following further describes in detail embodiments of this disclosure with reference to accompanying drawings.

The following is a brief description of concepts in this disclosure.

A parent node is a node having at least one directly-connected subordinate node, where the node is a parent node of the at least one directly-connected subordinate node, and the parent node is a relative concept. In a tree structure network, the node is directly connected to the at least one directly-connected subordinate node, that is, a connection between the node and any directly-connected subordinate node does not pass through another node. The node is a node at an $i^{th}$ layer of the tree structure network, and the at least one directly-connected subordinate node is a node at an $(i+1)^{th}$ layer of the tree structure network, where i=1, 2, 3, . . . .

A child node is a directly-connected subordinate node of a parent node, that is, a connection between the child node and the parent node does not pass through another node. In a tree structure network, the parent node is located at an $i^{th}$ layer, and the child node of the parent node is located at an $(i+1)^{th}$ layer.

A subnode is a subordinate node of the parent node, and a node accessing the parent node may be referred to as the subnode of the parent node. A connection between the subnode and the parent node may not pass through another node, or may pass through at least one another node. In a tree structure network, the parent node is located at an $i^{th}$ layer, and the subnode of the parent node is located at a $j^{th}$ layer, where j=i+1, i+2, i+3, . . . .

An address includes one or more bits and is used to uniquely identify a node in a network.

High-order m bits of the address are a highest-order 1st bit to an mth bit of the address. For example, it is assumed that the address is "10011010", and the address is from high to low from left to right, that is, the leftmost bit "1" of the address is a most significant bit of the address, and the rightmost bit "0" of the address is a least significant bit of the address. It is assumed that m=3. High-order three bits of the address are a highest-order $1^{st}$ bit to a $3^{rd}$ bit of the address, that is, "100".

The low-order n bits of the address are lowest-order n bits of the address. For example, the address "10011010" is still used as an example. It is assumed that n=4. The low-order four bits of the address are lowest-order four bits of the address, that is, "1010".

Carrying may be understood as including. A field in a message carries an address, and essentially means that the field includes the address.

An address pool includes one or more addresses. Address pools are divided into a first address pool and a second address pool. A quantity of bits included in each address in the first address pool is p, and p is a specified integer greater than 0. In other words, all addresses in the first address pool have a same length that is equal to p. For example, p is an integer value such as 2, 3, or 4. It is assumed that p=2. An address or addresses in the first address pool may be "00", "01", "10", and/or "11". The second address pool includes a first-type address and/or a second-type address. A quantity of bits included in the first-type address is less than p, a quantity of bits included in the second-type address is greater than p, and high-order p bits of the second-type address are a specified address in the first address pool. For example, it is assumed that p=2. The specified address in the first address pool is "11", the first-type address includes "1" and/or "0", and the second-type address includes "110", "111", "1100", "1101", or the like.

A condition for allowing a node to assign an address defines a condition under which a node can assign an address. When low-order n bits of an address of the node meet the condition, the node can assign an address. The condition for allowing a node to assign an address includes a first condition, a second condition, and/or a third condition. The first condition is that n=p and p is a specified integer. The second condition is that p is a specified integer and first p bits of the low-order n bits are a specified address. The third condition is that values of first n−1 bits of the low-order n bits are all 1 and a value of a last bit is 0.

A condition for prohibiting a node from assigning an address defines a condition under which a node cannot assign an address. When low-order n bits of an address of the node meet the condition, the node cannot assign an address. The condition for prohibiting a node from assigning an address includes a fourth condition and/or a fifth condition. The fourth condition is that the length of the low-order n bits of the address of the node is less than a specified integer p. The fifth condition is that values of first n−1 bits of the low-order n bits are all 1 and a value of a last bit is 1.

Refer to FIG. 1. This disclosure provides a network architecture 100. The network architecture 100 is a tree-structured network, and includes: a root node A, where the root node A has at least one child node, and the at least one child node accesses the root node A.

For any one of the at least one child node, a direct connection is established between the root node A and the child node, so that the child node accesses the root node A.

For example, refer to FIG. 1. The at least one child node includes a node B1, a node B2, a node B3, a node B4, a node B5, a node B6, and a node B7. The root node A separately establishes a direct connection to the node B1, the node B2, the node B3, the node B4, the node B5, the node B6, and the node B7, so that the node B1, the node B2, the node B3, the node B4, the node B5, the node B6, and the node B7 separately access the root node A.

For any one of the at least one child node, a type of the node may be a leaf node and does not have a subnode access right, or a type of the node may be a non-leaf node and has a subnode access right.

When the type of the node is the non-leaf node, the node may have at least one child node. For any one of the at least one child node, the node establishes a direct connection to the child node, so that the child node accesses the node.

For example, refer to FIG. 1. A type of the node B2 is the non-leaf node, the node B2 has at least one child node, and the at least one child node includes a node C1, a node C2, a node C3, a node C4, a node C5, and a node C6. The node B2 separately establishes a direct connection to the node C1, the node C2, the node C3, the node C4, the node C5, and the node C6, so that the node C1, the node C2, the node C3, the node C4, the node C5, and the node C6 separately access the node B2.

In some embodiments, the network architecture 100 is a wireless network architecture, a wired network architecture, or the like.

In some embodiments, the network architecture 100 is an Internet of things (IoT) network or the like.

For a node in the network architecture 100, when a type of the node is the non-leaf node, a direct connection between the node and a child node of the node does not pass through another node.

For the direct connection between the node and the child node, the direct connection between the node and the child node may be a wireless network connection when the network architecture 100 is the wireless network architecture. When the network architecture 100 is the wired network architecture, a wired line connection exists between the node and the child node, and the direct connection between the node and the child node is a connection established on a wired line.

For example, as shown in FIG. 1, for the node B2, the node C1 is a child node of node B2, and a direct connection between the node C1 and the node B2 does not pass through another node. The direct connection between the node C1 and the node B2 is a wireless network connection, or the direct connection between the node C1 and the node B2 is a connection established on a wired line between the node C1 and the node B2.

For each node whose type is the non-leaf node in the network architecture 100, the node may assign an address, that is, each node has an address assignment function.

In some embodiments, for each node, the address assignment function of the node is enabled, so that the node assigns, by using the address assignment function, an address to a subnode accessing the node. Alternatively, the address assignment function of the node is not enabled, so that although the node has the address assignment function and can assign an address, the node does not assign an address to a subnode accessing the node.

For the node whose type is the non-leaf node in the network architecture 100, when the address assignment function of the node is enabled, the node may assign, by using the address assignment function, addresses to w layers of subnodes that access the node, where w is an integer greater than 0. A first-layer subnode of the node includes a child node of the node, and a second-layer subnode of the node includes a grandchild node of the node. Meanings of a third-layer subnode to a $w^{th}$-layer subnode are deduced by analogy. Details are not described again.

The node includes w first address pools, and the w first address pools are in a one-to-one correspondence with the w layers, that is, each layer of subnodes corresponds to one first address pool. A quantity of bits included in each address in the first address pool is p, and p is a specified integer greater than 0. Therefore, each first address pool includes $2^p$ addresses.

In some embodiments, the node further includes w second address pools, the w second address pools are in a one-to-one correspondence with the w layers, that is, each layer of subnodes corresponds to one second address pool, and the second address pool includes a first-type address and/or a second-type address. A quantity of bits included in the first-type address is less than p, a quantity of bits included in the second-type address is greater than p, and first p bits of the second-type address are a specified address in the first address pool. Therefore, a quantity of first-type addresses is equal to $(2^{p-1}+2^{p-2}+ \ldots +2)$, and a quantity of second-type addresses is infinite.

For example, it is assumed that w=1 and p=2. For the node A whose type is the non-leaf node in the network architecture 100 shown in FIG. 1, the address assignment function of the node A is enabled, and the node A assigns, by using the address assignment function, addresses to first-layer subnodes accessing the node, that is, assigns the addresses to the subnode B1, the subnode B2, the subnode B3, the subnode B4, the subnode B5, the subnode B6, and the subnode B7. For the node B2 whose type is the non-leaf node in the network architecture 100 shown in FIG. 1, the address assignment function of the node B2 is enabled, and the node B2 assigns, by using the address assignment function, addresses to first-layer subnodes accessing the node, that is, assigns the addresses to the subnode C1, the subnode C2, the subnode C3, the subnode C4, the subnode C5, and the subnode C6.

The node A (or the node B2) includes a first address pool corresponding to the first-layer subnode. The first address pool includes four addresses. A quantity of bits included in each address is two. In other words, the four addresses in the first address pool are respectively 00, 01, 10, and 11. It is assumed that the address "11" is a specified address in the first address pool, and the node A (or the node B2) further includes a second address pool corresponding to the first-layer subnode. A quantity of bits included in the first-type address in the second address pool is less than two, and the first-type address may be an address "0" and/or "1". A quantity of bits included in the second-type address in the second address pool is greater than two, and first two bits are "11". For example, the second-type address may be an address "110", "111", "1100", "1101", "1110", and/or "11111".

For another example, it is assumed that w=2 and p=2. For the node A whose type is the non-leaf node in the network architecture 100 shown in FIG. 1, the address assignment function of the node A is enabled, and the node A assigns, by using the address assignment function, addresses to first-layer subnodes and second-layer subnodes that access the node, that is, addresses are assigned to the subnode B1, the subnode B2, the subnode B3, the subnode B4, the subnode B5, the subnode B6, and the subnode B7 in the first-layer subnodes, and addresses are assigned to the subnode C1, the subnode C2, the subnode C3, the subnode C4, the subnode C5, and the subnode C6 in the second-layer subnodes. In this example, although the subnode B2 is the non-leaf node and can assign an address, the address assignment function of the subnode B2 is not enabled, and the subnode B2 does not assign addresses to the accessed subnode C1, subnode C2, subnode C3, subnode C4, subnode C5, and subnode C6.

The node A includes two first address pools. The two first address pools are respectively a first address pool 1 corresponding to the first-layer subnode and a first address pool 2 corresponding to the second-layer subnode. The first address pool 1 (or the first address pool 2) includes four addresses. A quantity of bits included in each address is two. In other words, the four addresses in the first address pool 1 (or the first address pool 2) are respectively 00, 01, 10, and 11. It is assumed that the address "11" is a specified address in the first address pool 1 (the first address pool 2), and the node A further includes two second address pools. The two second address pools are respectively a second address pool 1 corresponding to the first-layer subnode and a second address pool 2 corresponding to the second-layer subnode. A quantity of bits included in the first-type address in the second address pool 1 (or the second address pool 2) is less than two, and the first-type address may be an address "0" and/or "1". A quantity of bits included in the second-type address in the second address pool 1 (or the second address pool 2) is greater than two, and first two bits are "11". For example, the second-type address in the second address pool 1 (or the second address pool 2) may be an address "110", "111", "1100", "1101", "1110", and/or "11111".

For the node whose node type is the non-leaf node in the network architecture 100, a detailed process of assigning an address by the node is described in detail in a subsequent embodiment, and is not described herein.

Refer to FIG. 2. An embodiment of this disclosure provides an address assignment method 200. The method 200 may be applied to the network architecture 100 shown in FIG. 1, and includes the following steps.

Step 201: A first node receives an address assignment request sent by a second node, where the second node is a subnode of the first node.

The second node sends the address assignment request to a parent node of the second node. The parent node is the first node when an address assignment function of the parent node is enabled. When the address assignment function of the parent node is not enabled, the parent node continues to send the address assignment request to a parent node of the parent node until a node whose address assignment function is enabled receives the address assignment request, where the node whose address assignment function is enabled is the first node.

In some embodiments, when the network architecture 100 is a wireless network architecture, the second node selects a node when being started and requests to access the selected node. If the selected node can assign an address, that is, a type of the selected node is a non-leaf node, and the selected node has subnode access permission and the address assignment function, the selected node allows access of the second node, and establishes a direct connection to the second node. In this case, the selected node is the parent node of the second node. If the selected node cannot assign an address, that is, a type of the selected node is a leaf node, and the selected node does not have subnode access permission or the address assignment function, the selected node rejects the access request of the second node, and the second node reselects a node, requests to access the reselected node until the parent node is selected, and then sends the address assignment request to the parent node.

For example, it is assumed that the network architecture 100 shown in FIG. 1 is the wireless network architecture, and a node A, a node B1, a node B2, and a node B3 in the network architecture 100 are all non-leaf nodes, can all assign an address, and have subnode access permission and the address assignment function. It is assumed that the second node is a node C1. The node C1 selects a node when being started. It is assumed that the node B5 is selected, and the node C1 requests to access the node B5. Because a type of the node B5 is a leaf node, and the node B5 cannot assign an address and does not have the subnode access permission and the address assignment function, the node B5 rejects the access request of the node C1. The node C1 reselects a node. It is assumed that the node B2 is selected and the node C1 requests to access the node B2. Because the node B2 can assign an address and the node B2 has a subnode access function and the address assignment function, the node B2 allows access of the node C1 and establishes a direct connection to the node C1. In this case, the node B2 is the parent node of the node C1. Then, the node C1 sends the address assignment request to the node B2.

In some embodiments, when the network architecture 100 is a wired network architecture, a wired line connection exists between the second node and the parent node of the second node, and the second node directly sends the address assignment request to the parent node of the second node. For example, it is assumed that the network architecture 100 shown in FIG. 1 is the wired network architecture. A wired line connection exists between a node C1 and a node B2 in the network architecture 100, the node B2 is a parent node of the node C1, the node B2 can assign an address, the node B2 has a subnode access function and the address assignment function, and the node C1 sends the address assignment request to the node B2.

In the foregoing example, if the address assignment function of the node B2 is enabled, the node B2 is the first node in step 201, and subsequently performs an operation of assigning an address to the node C1. If the address assignment function of the node B2 is not enabled, and a parent node of the node B2 is a node A, the node B2 sends an address assignment request to the node A. The node A is a root node of the network architecture 100 and has the address assignment function. The address assignment function of the node A is enabled. The node A is the first node in step 201, and then performs the operation of assigning an address to the node C1.

In some embodiments, the address assignment request includes the type of the second node. The type of the second node is a leaf node or a non-leaf node.

In some embodiments, when the network architecture 100 is the wireless network architecture, the address assignment request includes the type of the second node.

Step 202: The first node obtains a second address, where the second address includes n bits, and n is an integer greater than 0.

In step 202, the first node selects one idle address from a first address pool as the second address, where the first node includes the first address pool, a quantity of bits included in each address in the first address pool is equal to p, and p is a specified integer greater than 0. In this case, n=p.

The first address pool corresponds to a layer quantity of subnodes in which the second node is located. For example, it is assumed that the second node is a first-layer subnode of the first node, and the first address pool corresponds to the first-layer subnode. It is further assumed that the second node is a second-layer subnode of the first node, and the first address pool corresponds to the second-layer subnode.

In some embodiments, the first node obtains the first address pool before selecting the idle address from the first address pool. The first node assigns addresses to w layers of subnodes that access the first node, that is, the first node assigns the addresses to a first-layer subnode to a $w^{th}$-layer subnode that access the first node. During implementation, the first node determines the layer quantity of the subnodes in which the second node is located, and obtains the first address pool corresponding to the layer quantity of the subnodes.

In some embodiments, the first node assigns addresses to one layer of subnodes, that is, w=1. To be specific, the first node assigns an address to only a child node of the first node, the second node is the child node of the first node, the first node includes one first address pool, and the first node may directly obtain the first address pool without determining the layer quantity of the subnodes in which the second node is located.

In some embodiments, the first node includes a network topology diagram of the network architecture 100, and the first node determines, based on the network topology diagram, the layer quantity of the subnodes in which the second node is located. Alternatively, the address assignment request includes the layer quantity of the subnodes, and the first node obtains, from the address assignment request, the layer quantity of the subnodes in which the second node is located.

In some embodiments, an initial value of the layer quantity, of the subnodes, included in the address assignment request sent by the second node is 1, and the parent node of the second node receives the address assignment request. If the address assignment function of the parent node is not enabled, the parent node adds the layer quantity of the subnodes to the address assignment request, and then sends the address assignment request to the parent node of the parent node.

In step 202, the first node may select an address from the first address pool as the second address in the following several manners. The several manners are respectively as follows:

In a first manner, the address in the first address pool is assigned only to a node whose type is a non-leaf node. Therefore, the first node further obtains the type of the second node before the first node selects the idle address from the first address pool. The first node selects one idle address from the first address pool as the second address when the type of the second node is the non-leaf node.

In the first manner, for one layer of subnodes in which the second node is located, the layer of subnodes include two types: a leaf node and the non-leaf node. A quantity of leaf nodes included in the layer of subnodes is less than or equal to a quantity of first-type addresses in a second address pool, and the second address pool corresponds to the layer quantity of the subnodes in which the second node is located. In other words, the quantity of leaf nodes included in the layer of subnodes is limited. In this way, the second address pool may not include a second-type address, and the second address pool includes robust first-type addresses that are assigned to leaf nodes in first-layer subnodes, so that the address in the first address pool is assigned only to a node whose type is the non-leaf node.

In some embodiments, the first node obtains the type of the second node from the address assignment request when the address assignment request sent by the second node includes the type of the second node.

In some embodiments, the first node includes a network topology of the network architecture 100. The first node determines, based on the network topology, whether the second node is the leaf node or the non-leaf node, and obtains the type of the second node based on a determining result.

For example, refer to FIG. 1. It is assumed that the second node is the node C1, a type of the node C1 is the non-leaf node, the first node is the node B2, the node C1 is a first-layer subnode of the node B2, the first address pool of the node B2 includes addresses "00", "01", "10", and "11", and the node B2 selects, from the four addresses, the idle address "00" as the second address.

For another example, still refer to FIG. 1. It is assumed that the second node is the node C1, a type of the node C1 is the non-leaf node, the first node is the node A, the node C1 is a second-layer subnode of the node A, the node A includes a first address pool 1 and a first address pool 2, and the first address pool 2 corresponds to the second-layer subnode. The node A determines that a layer quantity of subnodes in which the node C1 is located is "2", and obtains the first address pool 2 corresponding to the layer quantity "2" of the subnodes. The first address pool 2 includes addresses "00", "01", "10", and "11". The node A selects, from the four addresses, an idle address "00" as the second address.

In the first manner, when the type of the second node is the leaf node, the first node selects one idle first-type address from the second address pool as the second address. In this case, n is less than p.

The second address pool corresponds to the layer quantity of the subnodes in which the second node is located. For example, it is assumed that the second node is the first-layer subnode of the first node, and the second address pool corresponds to the first-layer subnode. It is further assumed that the second node is the second-layer subnode of the first node, and the second address pool corresponds to the second-layer subnode.

In some embodiments, the first node obtains the second address pool before selecting the idle address from the second address pool. The first node assigns addresses to w layers of subnodes that access the first node. During implementation, the first node determines the layer quantity of the subnodes in which the second node is located, and obtains the second address pool corresponding to the layer quantity of the subnodes.

In some embodiments, the first node assigns addresses to one layer of subnodes, that is, w=1. To be specific, the first node assigns the address to only a child node of the first node, the second node is the child node of the first node, the first node includes one second address pool, and the first node may directly obtain the second address pool without determining the layer quantity of the subnodes in which the second node is located.

For example, refer to FIG. 1. It is assumed that the second node is the node C1, a type of the node C1 is the leaf node, the first node is the node B2, the node C1 is a first-layer subnode of the node B2, the second address pool of the node B2 includes a first-type address, and the first-type address may be an address "0" and/or "1". It is assumed that the node B2 selects an idle first-type address "0" from the second address pool as the second address.

For another example, still refer to FIG. 1. It is assumed that the second node is the node C1, a type of the node C1 is the leaf node, the first node is the node A, the node C1 is a second-layer subnode of the node A, the node A includes a second address pool 1 and a second address pool 2, and the second address pool 2 corresponds to the second-layer subnode. The node A determines that a layer quantity of subnodes in which the node C1 is located is "2", and obtains the first address pool 2 corresponding to the layer quantity "2" of the subnodes. The second address pool 2 of the node A includes a first-type address, and the first-type address may be an address "0" and/or "1". It is assumed that the node A selects an idle address "0" from the second address pool 2 as the second address.

In a second manner, at least one address in the first address pool is a specified address, and a non-specified address other than the specified address in the first address pool is assigned only to a node whose type is a non-leaf node. Therefore, the first node further obtains the type of the second node before the first node selects the idle address from the first address pool. The first node selects one idle non-specified address from the first address pool as the second address when the type of the second node is the non-leaf node.

In the second manner, for one layer of subnodes in which the second node is located, the layer of subnodes include two types: a leaf node and the non-leaf node, and a quantity of leaf nodes included in the layer of subnodes is not limited. For the second address pool corresponding to the layer quantity of the subnodes in which the second node is located, the second address pool includes a first-type address and/or a second-type address, and a quantity of second-type addresses is unlimited. Therefore, the second address pool has robust addresses that are assigned to leaf nodes included in the layer of subnodes, so that a non-specified address in the first address pool is assigned only to a node whose type is the non-leaf node.

An operation of obtaining, by the first node, the type of the second node in the second manner is the same as an operation of obtaining, by the first node, the type of the second node in the first manner, and details are not described herein again.

In the second manner, when the type of the second node is the leaf node, the first node selects one idle specified address from the first address pool as the second address. In this case, n=p. Alternatively, the first node selects one idle address from the second address pool as the second address. In this case, n is not equal to p, that is, n may be less than p, or n may be greater than p.

n is less than p when the idle address selected by the first node from the second address pool is the first-type address. n is greater than p when the idle address selected by the first node from the second address pool is a second-type address.

The second address pool corresponds to the layer quantity of the subnodes in which the second node is located. An operation of obtaining, by the first node, the second address pool corresponding to the layer quantity of the subnodes is the same as an operation of obtaining, by the first node, the second address pool in the first manner, and details are not described herein again.

For example, refer to FIG. 1. It is assumed that the second node is the node C1, a type of the node C1 is the leaf node, the first node is the node B2, the node C1 is a first-layer subnode of the node B2, the second address pool of the node B2 includes a first-type address and/or a second-type address, the first-type address may be an address "0" and/or "1", and the second-type address may be an address "110", "111", "1100", "1101", "1110", and/or "11111". It is assumed that the node B2 selects an idle address "110" from the second address pool as the second address.

For another example, still refer to FIG. 1. It is assumed that the second node is the node C1, a type of the node C1 is the leaf node, the first node is the node A, the node C1 is a second-layer subnode of the node A, the node A includes a second address pool 1 and a second address pool 2, and the second address pool 2 corresponds to the second-layer subnode. The node A determines that a layer quantity of subnodes in which the node C1 is located is "2", and obtains the first address pool 2 corresponding to the layer quantity "2" of the subnodes. The second address pool 2 of the node A includes a first-type address and/or a second-type address. The first-type address may be an address "0" and/or "1", and the second-type address may be an address "110", "111", "1100", "1101", "1110", and/or "11111". It is assumed that the node A selects an idle address "110" from the second address pool 2 as the second address.

In a third manner, when there is an idle address in the first address pool, the first node selects one idle address from the first address pool as the second address.

The third manner may be applied to a wireless network architecture. After accessing a parent node selected by the second node, the second node requests the first node to assign an address. In this case, the first node may not need to obtain the type of the second node. The first node selects one idle address from the first address pool as the second address provided that there is an idle address in the first address pool.

For one layer of subnodes in which the second node is located, a quantity of leaf nodes included in the layer of subnodes is limited, that is, the quantity of leaf nodes is less than or equal to a quantity of first-type addresses in the second address pool; or a quantity of leaf nodes included in the layer of subnodes is not limited, and the second address pool corresponds to the layer quantity of the subnodes in which the second node is located.

Therefore, in the third manner, when the quantity of leaf nodes included in the layer of subnodes is limited, the address in the first address pool is assigned only to a node whose type is the non-leaf node. Therefore, when the second address is an address assigned by the first node from the first address pool, the first node determines that the type of the second node is the non-leaf node.

When there is no idle address in the first address pool, the first node obtains a second address pool corresponding to the layer quantity of the subnodes in which the second node is located, where the second address pool includes a first-type address; and selects one idle first-type address from the second address pool as the second address, where n is less than p. The first node determines that the type of the second node is the leaf node.

When the quantity of leaf nodes included in the layer of subnodes is not limited, the non-specified address in the first address pool is assigned only to a node whose type is the non-leaf node. Therefore, when the second address is a non-specified address assigned by the first node from the first address pool, the first node determines that the type of the second node is the non-leaf node. When the second address is a specified address assigned by the first node from the first address pool, the first node determines that the type of the second node is the leaf node.

When there is no idle address in the first address pool, the first node obtains a second address pool corresponding to the layer quantity of the subnodes in which the second node is located, where the second address pool includes a first-type address and/or a second-type address; and selects one idle first-type address from the second address pool as the second address, where n is less than p; or selects one second-type address from the second address pool as the second address, where n is greater than p. The first node determines that the type of the second node is the leaf node.

The second address pool corresponds to the layer quantity of the subnodes in which the second node is located. An operation of obtaining, by the first node, the second address pool corresponding to the layer quantity of the subnodes is the same as an operation of obtaining, by the first node, the second address pool in the first manner, and details are not described herein again.

In the first manner, the second manner, or the third manner, the second address may meet a condition for allowing a node to assign an address. In this case, the second node can assign an address, that is, the type of the second node is the non-leaf node. Alternatively, the second address may meet a condition for prohibiting a node from assigning an address, that is, the type of the second node is the leaf node.

The condition for allowing a node to assign an address includes a first condition. The second node can assign an address if first p bits of the second address meet the first condition. The first condition is that n=p and p is a specified integer, that is, a length of the second address is p.

In some embodiments, the first condition further includes the following content: the second address is a non-specified address in the first address pool.

The condition for prohibiting a node from assigning an address includes a third condition and/or a fourth condition. The second node cannot assign an address if first p bits of the second address meet the third condition; or the second node cannot assign an address if a length of the second address meets the fourth condition. The third condition is that n is greater than p, p is a specified integer, and the first p bits are a specified address. The fourth condition is that the length of the second address is less than a specified integer p.

Step 203: The first node obtains an address of the second node based on a third address and the second address, where the third address is an address of a parent node of the second node.

The address length of the second node is m+n, and m is an address length, namely, a length of the third address, of the parent node of the second node. High-order m bits of the address of the second node are the same as low-order m bits of the address of the first node, and low-order n bits of the address of the second node are the second address.

In step 203, when the second node is a first-layer subnode of the first node, the first node is the parent node of the second node, the third address is the address of the first node, and the first node constitutes the address of the second node by using the third address and the second address.

In step 203, when the second node is a $v^{th}$-layer subnode of the first node, where v is an integer greater than 1 and less than or equal to w. There is at least one other node between the first node and the second node. The first node obtains an address of the parent node of the second node to obtain the third address, and the first node constitutes the address of the second node by using the third address and the second address.

For example, it is assumed that the first node is the node B2, the second node is the node C1, the second address is "00", the third address is an address of the node B2, and the third address is "101". In this way, the address of the second node C1 obtained by the node B2 is "10100", and an address length of the second node C1 is 5.

It is assumed that the first node is the node A, the second node is the node C1, and the second address is "00". The first node A obtains an address of the parent node B2 of the second node C1 as the third address, and the third address is "101". In this way, the address of the second node C1 obtained by the first node A is "10100", and an address length of the second node C1 is 5.

Step 204: The first node sends an address assignment response to the second node, where the address assignment response includes the address of the second node.

In some embodiments, the address assignment response further includes the type of the second node.

In some embodiments, the address assignment response further includes the type of the second node when the first node obtains the second address in the foregoing third manner.

In some embodiments, the second address is an address in the first address pool or the second address is a non-specified address in the first address pool, and the type of the second node is the non-leaf node. If the second address is an address in the second address pool or the second address is a specified address in the first address pool, the type of the second node is the leaf node.

The second node receives the address assignment response, and sets the address of the second node to an address included in the address assignment response.

In some embodiments, when the address assignment response includes the type of the second node, the second node sets the type of the second node to the type included in the address assignment response.

In some embodiments, the address assignment response includes a field whose length is equal to x bytes, and the field includes the address of the second node.

In some embodiments, the field includes x subfields, and a length of each subfield is one byte. A first bit of an $x^{th}$ subfield carries an end indication, and the end indication is used to indicate that the $x^{th}$ subfield is a last subfield of the field. For each of a $1^{st}$ subfield to an $(x-1)^{th}$ subfield, a first bit of the subfield carries a belonging indication, and the belonging indication is used to indicate that the subfield belongs to the field. Values of a $2^{nd}$ bit to an eth bit of the $1^{st}$ subfield are 0, and an $(e+1)^{th}$ bit to an $8^{th}$ bit of the $1^{st}$ subfield and a $2^{nd}$ bit to an $8^{th}$ bit of each of a $2^{nd}$ subfield to the $x^{th}$ subfield are both the address of the second node, where e=7*x−m−n+1, and * is a multiplication operation.

For example, the address of the second node is "1110111010", that is, m+n=10; the address assignment response includes a field whose length is two bytes, that is, x=2; and the field includes a first subfield and a second subfield, where e=2*7−m−n+1=14−10+1=5. A $1^{st}$ bit of the second subfield carries an end indication "0", and the end indication "0" is used to indicate that the second subfield is a last subfield of the field. A $1^{st}$ bit of the first subfield carries a belonging indication "1", and the belonging indication "1" is used to indicate that the first subfield belongs to the field. Values of a $2^{nd}$ bit to a $5^{th}$ bit of the first subfield are 0, and a $6^{th}$ bit to an $8^{th}$ bit of the first subfield and a $2^{nd}$ bit to an $8^{th}$ bit of the second subfield are the address "1110111010" of the second node. Therefore, the first subfield is 10000111, the second subfield is 00111010, and the field is 1000011100111010.

In some embodiments, the first node may be a subnode of a specific node. When the first node accesses a parent node of the first node, the first node also requests to assign the first address based on step 201 to step 204, and updates first m bits of each address in a node set to the first address, where the node set includes a subnode of the first node.

During implementation, the first node sends an update request to each node in the node set, where the update request includes the first address and m. For any node in the node set, to receive the update request, the node updates first m bits of an address of the node to the first address.

For example, refer to FIG. 3. It is assumed that an address of a node A is "1", that is, m=1. The node A accesses a parent node D of the node A, and the node A requests to assign a first address. It is assumed that the assigned first address is "110". The node A sends an update request to a node B1, a node B2, a node B3, a node B4, a node B5, a node B6, a node B7, a node C1, a node C2, a node C3, a node C4, a node C5, and a node C6, where the update request includes the first address "110" and m that is equal to 1.

For the node B2, an address of the node B2 is "101". The node B2 receives the update request, and updates a previous bit "1" in "101" to "110", to obtain an address "11001" of the node B2. For an updated address of another node, refer to FIG. 3.

In some embodiments, when the second node is a non-leaf node, the second node enables an address assignment function or does not enable the address assignment function.

In this embodiment of this disclosure, the second node is a subnode of the first node. Because an address of the first node includes m bits, an address of the second node includes m+n bits, and high-order m bits of the address of the second node are the same as low-order m bits of the address of the first node, the first node uses the address of the first node as high-order bits when assigning an address, and adds low-order n bits on this basis, to obtain the address of the second node. In this way, the first node assigns an address to the subnode of the first node. Therefore, the address assignment function is distributed on different non-leaf nodes in a network, and a server dedicated to address assignment does not need to be separately disposed, thereby reducing address assignment costs. In addition, a distance between the subnode of the first node and the first node is usually relatively short. In this way, network resources consumed during address assignment can be reduced. Because the first node is responsible for assigning the address to the subnode of the first node, the address assignment function is distributed on the different non-leaf nodes. In this way, the address is quickly assigned. Because the assigned address includes the m+n bits, and the high-order m bits of the address are the same as the low-order m bits of the address of the first node, the assigned address is short and flexible, and bit efficiency of the address is high. That is, the assigned address can further be changed longer and is relatively flexible.

Refer to FIG. 4. An embodiment of this disclosure provides an address assignment method 400. The method 400 may be applied to the network architecture 100 shown in FIG. 1, and includes the following steps.

Step 401 is the same as step 201, and details are not described herein again.

Step 402: The first node obtains a second address, where the second address includes n bits, n is an integer greater than 0, and values of the n bits included in the second address are all a bit 1; or values of first n−1 bits in the second address are all 1 and a value of a least significant bit is 0.

In step 402, the first node assigns the n bits, where a value of each bit is 1, or values of a $1^{st}$ bit to an (n−1)th bit are all 1, and a value of the nth bit is 0. The n bits are used as the second address.

In step 402, the first node may obtain the second address in the following several manners. The several manners are respectively as follows:

In a first manner, the first node obtains a type of the second node. When the type of the second node is a leaf node, n bits with a value of 1 are assigned, where the n bits are used as the second address. When the type of the second node is a non-leaf node, n bits are assigned, where values of a $1^{st}$ bit to an $(n-1)^{th}$ bit are 1, a value of an nth bit is 0, and the n bits are used as the second address.

For a detailed process in which the first node obtains the type of the second node, refer to the detailed process in which the first node obtains the type of the second node in step 202 shown in FIG. 2. Details are not described herein again.

For example, refer to FIG. 5. It is assumed that the first node is a node A or a node B1, the second node is a node C1, and n=2. Two bits are assigned to the first node A (or B1), and the two bits may be "10" or "11". "10" is used as the second address if a type of the node C1 is the non-leaf node; "11" is used as the second address if a type of the node C1 is the leaf node.

For another example, refer to FIG. 5. It is assumed that the first node is a node A or a node B1, the second node is a node C2, and n=3. Three bits are assigned to the first node A (or B2), where the three bits may be "110" or "111". "110" is used as the second address if a type of the node C2 is the non-leaf node; "111" is used as the second address if a type of the node C2 is the leaf node.

In a second manner, the first node assigns n bits with a value of 1, uses the n bits as the second address, and determines that the type of the second node is the leaf node; or assigns n bits, where values of a $1^{st}$ bit to an $(n-1)^{th}$ bit are 1, and a value of an nth bit is 0, and uses the n bits as the second address, and determines that the type of the second node is the non-leaf node.

The second manner may be applied to a wireless network architecture. After accessing a parent node selected by the second node, the second node requests the first node to assign an address. In this case, the first node may directly obtain the second address in the second manner without obtaining the type of the second node.

In some embodiments, the second address may meet a condition for allowing a node to assign an address. In this case, the second node can assign an address, and the type of the second node is the non-leaf node, that is, the first node determines that the type of the second node is the non-leaf node. Alternatively, the second address may meet a condition for prohibiting a node from assigning an address, and the type of the second node is the leaf node, that is, the first node determines that the type of the second node is the leaf node.

In some embodiments, the condition for allowing a node to assign an address includes a second condition. The second node can assign an address if the first n−1 bits and the last bit of the second address meet the second condition.

In some embodiments, the condition for prohibiting a node from assigning an address includes a fifth condition. The second node cannot assign an address if the first n−1 bits and the last bit of the second address meet the fifth condition.

In some embodiments, the second condition is that the values of the first n−1 bits in the second address are all 1 and the value of the last bit in the second address is 0, and the fifth condition is that the values of the first n−1 bits in the second address are all 1 and the value of the last bit in the second address is 1.

Steps 403 and 404: are respectively the same as steps 203 and 204. Details are not described herein again.

For example, refer to FIG. 5. It is assumed that the second node is a node C1, the second address is "10", and a parent node of the node C1 is a node B1. It is assumed that an address of the node B1 is "110", "110" is used as high-order three bits of an address of the node C1, and "10" is used as low-order two bits of the address of the node C1, so that the address of the node C1 is "11010".

For another example, refer to FIG. 5. It is assumed that the second node is a node C2, the second address is "111", and a parent node of the node C2 is a node B1. It is assumed that an address of the node B1 is "110", "110" is used as high-order three bits of an address of the node C2, and "111" is used as low-order three bits of the address of the node C2, so that the address of the node C2 is "110111".

In some embodiments, in step 404, the address assignment response sent by the first node further includes the type of the second node.

In some embodiments, the address assignment response further includes the type of the second node when the first node obtains the second address in the foregoing second manner.

In some embodiments, the type of the second node is the non-leaf node when values of the $1^{st}$ bit to the $(n-1)^{th}$ bit in the second address are all 1 and the value of the $n^{th}$ bit is 0. The type of the second node is the leaf node when a value of each bit in the second address is 1.

In this embodiment of this disclosure, because the address of the first node includes the m bits, the address of the second node includes the m+n bits, and the high-order m bits of the address of the second node are the same as the low-order m bits of the address of the first node, the first node uses the address of the first node as high-order bits when assigning an address, and adds low-order n bits on this basis, to obtain the address of the second node. In addition, values of first n−1 bits in an address of the low-order n bits are all 1 and a value of a last bit is 0 when the second node is the non-leaf node. Values of the low-order n bits are all 1 when the second node is the leaf node. This simplifies complexity of address assignment and can improve address assignment efficiency. In addition, the second node may be a subnode of the first node, and the first node assigns an address to the subnode of the first node. Therefore, the address assignment function is distributed on different non-leaf nodes in a network, and a server dedicated to address assignment does not need to be separately disposed, thereby reducing address assignment costs. In addition, a distance between the subnode of the first node and the first node is usually relatively short. In this way, network resources consumed during address assignment can be reduced. Currently, when a server assigns addresses in a unified manner, the server is under relatively heavy pressure, affecting address assignment efficiency. However, in this disclosure, because the first node is responsible for assigning the address to the subnode of the first node, the address assignment function is distributed on the different non-leaf nodes. In this way, the address is quickly assigned. Because the assigned address includes the m+n bits, and the high-order m bits of the address are the same as the low-order m bits of the address of the first node, the assigned address is short and flexible, and bit efficiency of the address is high.

Figure 6:
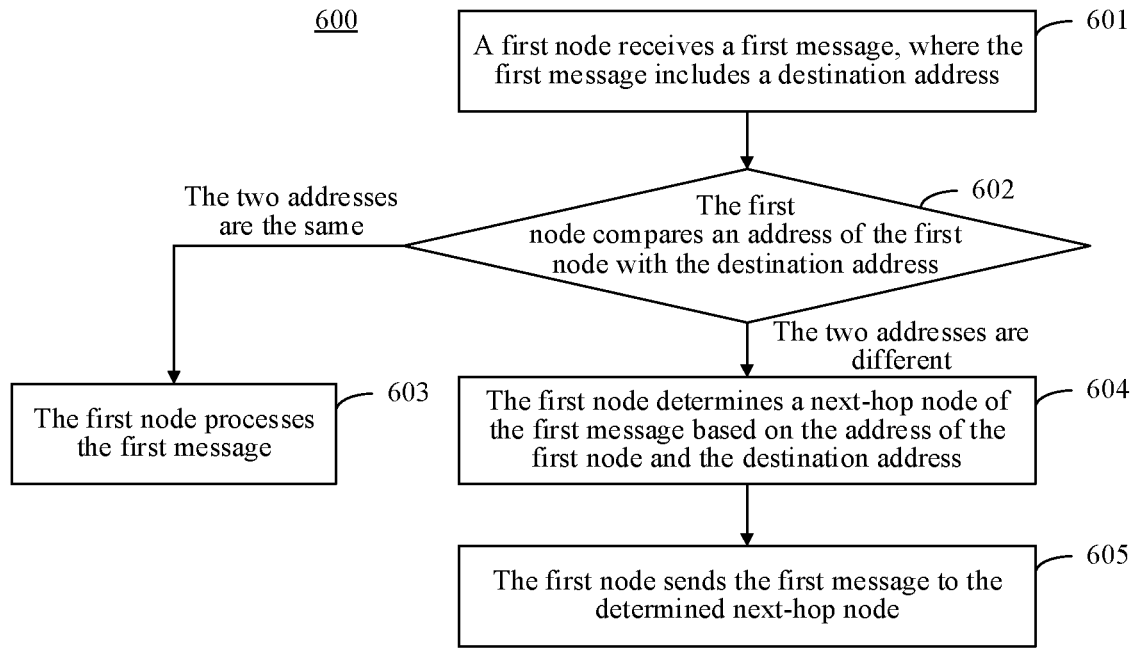
FIG. 6 is a flowchart of a node determining method according to an embodiment of this disclosure.

Refer to FIG. 6. An embodiment of this disclosure provides a node determining method 600. The method 600 may be applied to the network architecture 100 shown in FIG. 1, FIG. 3, or FIG. 5, and includes the following steps.

Step 601: A first node receives a first message, where the first message includes a destination address.

The destination address includes x bits, where x is an integer greater than 0. An address of the first node includes y bits, where y is an integer greater than 0.

Highest-order m bits of the destination address are the same as lowest-order m bits of an address of a parent node of a second node, the second node is a node corresponding to the destination address, m is an address length of the parent node, and m is an integer greater than 0 and less than x.

The destination address may be assigned by the second node according to the method 200 shown in FIG. 2 or the method 400 shown in FIG. 4.

For example, FIG. 1 shows the first node B2. The first node B2 receives a first message, where a destination address included in the first message is "10100", that is, x=5; and an address of the node B2 is "101", that is, y=3. A node corresponding to the destination address is the node C1, a parent node of the node C1 is the node B2, an address of the node B2 is "101", and a length of the address "101" of the node B2 is 3, that is, m=3.

For another example, FIG. 5 shows the first node B1. The first node B1 receives a first message, where a destination address included in the first message is "11010", that is, x=5; and an address of the node B1 is "110", that is, y=3. A node corresponding to the destination address is the node C1, a parent node of the node C1 is the node B1, an address of the node B1 is "110", and a length of the address "110" of the node B1 is 3, that is, m=3.

In some embodiments, the first message includes a field whose length is equal to v bytes, and the field includes the destination address.

In some embodiments, the field includes v subfields, and a length of each subfield is one byte. A first bit of a $v^{th}$ subfield carries an end indication, and the end indication is used to indicate that the $v^{th}$ subfield is a last subfield of the field. For each of a $1^{st}$ subfield to a $(v-1)^{th}$ subfield, a first bit of the subfield carries a belonging indication, and the belonging indication is used to indicate that the subfield belongs to the field. Values of a $2^{nd}$ bit to an eth bit of the $1^{st}$ subfield are 0, and an $(e+1)^{th}$ bit to an $8^{th}$ bit of the $1^{st}$ subfield and a $2^{nd}$ bit to an $8^{th}$ bit of each of a $2^{nd}$ subfield to the $x^{th}$ subfield are both the address of the second node, where e=7*v−m−n+1.

In some embodiments, the first node receives the first message, identifies a start location of the first subfield included in the field from the first message, determines, based on the start location and a first bit of each of the v subfields, the v subfields included in the field, and reads the destination address from the v subfields.

Step 602: The first node compares the address of the first node with the destination address, and performs step 603 if the two addresses are the same, or performs step 604 if the two addresses are different.

If the address of the first node is the same as the destination address, the first node and the second node are a same node, the first message is a message sent by another node to the first node, and the following operation of step 603 is performed.

If the address of the first node is different from the destination address, the first node and the second node are different nodes, the second node may be a subnode of the first node, or may not be the subnode of the first node, and the following operation of step 604 is performed. Step 603: The first node processes the first message, and the process ends.

The address of the first node is the same as the destination address, indicating that x=y.

Step 604: The first node determines a next-hop node of the first message based on the address of the first node and the destination address.

In some embodiments, referring to FIG. 7, in step 604, the first node determines the next-hop node of the first message based on operation 61 to operation 65 in the following, where operation 61 to operation 65 are respectively as follows:

61: The first node compares x with y, and performs operation 62 if x is less than y, or performs operation 63 if x is greater than or equal to y.

If x is less than y, it indicates that a length of the destination address is less than a length of the address of the first node, and the second node corresponding to the destination address is not the subnode of the first node.

If x is greater than or equal to y, it indicates that a length of the destination address is greater than or equal to a length of the address of the first node, and the second node corresponding to the destination address may be the subnode of the first node, or may not be the subnode of the first node.

For example, refer to FIG. 1. It is assumed that the first node is the node B2, the first address is an address "101" of the node B2, that is, y=3, and the destination address included in the first message is "10100", that is, x=5. The node B2 finds that x is greater than y through comparison, and performs operation 63.

For another example, refer to FIG. 5. It is assumed that the first node is the node B1, the first address is an address "110" of the node B1, that is, y=3, and the destination address included in the first message is "11010", that is, x=5. The node B1 finds that x is greater than y through comparison, and performs operation 63.

62: The first node determines that the next-hop node of the first message is a parent node of the first node, and the process ends.

When a length x of the destination address is less than a length y of the address of the first node, it indicates that the second node corresponding to the destination address is not the subnode of the first node. Therefore, the first node sends the first message to the parent node of the first node, and the parent node of the first node processes the first message. For example, the parent node of the first node processes the first message when the second node corresponding to the destination address is the parent node of the first node; or the parent node of the first node forwards the first message when the second node corresponding to the destination address is not the parent node of the first node. Therefore, the first node determines that the next-hop node of the first message is the parent node of the first node.

63: The first node determines whether the address of the first node is the same as the first address, where the first address is highest-order y bits of the destination address; and performs operation 64 if the two addresses are different; or performs operation 65 if the two addresses are the same.

It indicates that the second node corresponding to the destination address is not the subnode of the first node when the address of the first node is different from the first address. It indicates that the second node corresponding to the destination address is the subnode of the first node when the address of the first node is the same as the first address.

For example, refer to FIG. 1. It is assumed that the first node is the node B2, an address of the node B2 is "101", that is, y=3, and the destination address included in the first message is "10100", where highest-order three bits of the destination address "10100" are "101", that is, the first address is "101". The node B2 compares the address "101" of the node B2 with the first address "101", and finds that the two addresses are the same through comparison. Therefore, the node C1 corresponding to the destination address "10100" is obtained to be the subnode of the node B2.

For another example, refer to FIG. 5. It is assumed that the first node is the node B1, the first address is an address "110" of the node B1, that is, y=3, and the destination address included in the first message is "11010", where highest-order three bits of the destination address "11010" are "110", that is, the first address is "110". The node B1 compares the address "110" of the node B1 with the first address "110", and finds that the two addresses are the same through comparison. Therefore, the node B1 determines that the node C1 corresponding to the destination address "11010" is the subnode of the node B1.

64: The first node determines that the next-hop node of the first message is a parent node of the first node, and the process ends.

When the address of the first node is different from the first address, it indicates that the address of the first node is different from high-order y bits of the destination address, and the second node is not the subnode of the first node. The first node needs to send the first message to the parent node of the first node. Therefore, the first node determines that the next-hop node of the first message is the parent node of the first node.

65: The first node determines the next-hop node of the first message based on a second address, where the second address is a part other than the first address in the destination address.

In some embodiments, the destination address is an address that the second node requests to assign by using the method 200 shown in FIG. 2. In this case, in operation 65, when a quantity of bits included in the second address is less than or equal to p or first p bits of the second address are a specified address, a second node corresponding to the destination address is a child node of the first node; and the first node determines that the next-hop node of the first message is the child node corresponding to the destination address, where p is a specified integer greater than 0.

For example, refer to FIG. 1. It is assumed that the first node is the node B2, p=2, an address of the first node B2 is "101", and the destination address included in the first message is "10100". Therefore, the first address is "101", and the second address is a part other than "101" in the destination address "10100", that is, the second address is "00". A quantity of bits included in the second address "00" is equal to p. Therefore, the node C1 corresponding to the destination address "10100" is a child node of the first node B2, and the first node B2 determines that the next-hop node of the first message is the child node C1 corresponding to the destination address "10100".

In some embodiments, the destination address is an address that the second node requests to assign by using the method 200 shown in FIG. 2. In operation 65, when a quantity of bits included in the second address is greater than p and first p bits of the second address are not a specified address, the first node determines that the next-hop node of the first message is a node corresponding to a third address, where the third address includes the first address and the first p bits of the second address.

When the quantity of bits included in the second address is greater than p and the first p bits of the second address are not the specified address, the second node corresponding to the destination address accesses a child node of the first node, the second node is a subnode of the child node, and the third address is an address of the child node. Because the second node is a subnode of the child node, the first node needs the child node corresponding to the third address to forward the first message. Therefore, the first node determines that the next-hop node of the first message is the node corresponding to the third address.

For another example, refer to FIG. 1. It is assumed that the first node is a node A, p=2, an address of the first node A is "1", and the destination address included in the first message is "10100". Therefore, the first address is "1", and the second address is a part other than "1" in the destination address "10100", that is, the second address is "0100". A quantity of bits included in the second address "0100" is greater than p. Therefore, the node C1 corresponding to the destination address "10100" is a child node (the node B2) that accesses the node A. The third address includes the first address "1" and the first p bits "01" of the second address "0100", that is, the third address is "101". The first node A determines that the next-hop node of the first message is the child node B2 corresponding to the third address "101".

In some embodiments, the destination address is an address that the second node requests to assign by using the method 400 shown in FIG. 4. In operation 65, when a value of each bit included in the second address is 1, or when a value of a least significant bit in the second address is 0 and a value of each of other bits other than the least significant bit in the second address is 1, a node corresponding to the destination address is a child node of the first node; and the first node determines that the next-hop node of the first message is the child node corresponding to the destination address.

For example, refer to FIG. 5. It is assumed that the first node is the node B1, an address of the first node B1 is "110", the destination address included in the first message is "11010", the first address is "110", and the second address is a part other than "110" in the destination address "11010", that is, the second address is "10". The first node B1 determines, when a value of a least significant bit in the second address is 0 and a value of each other bit other than the least significant bit in the second address is 1, that the next-hop node of the first message is a node C1 corresponding to the destination address "11010", where the node C1 corresponding to the destination address "11010" is a child node of the first node B1.

In some embodiments, the destination address is an address that the second node requests to assign by using the method 400 shown in FIG. 4. In this case, in operation 65, the first node obtains a fourth address when a bit whose value is 0 exists in other bits other than the least significant bit in the second address, where the fourth address is first z bits of the second address, z is an integer greater than 0, a value of a least significant bit of the fourth address is 0, and values of the first z−1 bits of the fourth address are all 1. The first node determines that the next-hop node of the first message is a node corresponding to a third address, where the third address includes the first address and the fourth address.

The second node corresponding to the destination address accesses a child node of the first node, the second node is a subnode of the child node, and the third address is an address of the child node. Because the second node is a subnode of the child node, the first node needs the child node corresponding to the third address to forward the first message.

For example, refer to FIG. 5. It is assumed that the first node is the node A, an address of the first node A is "1", the destination address included in the first message is "11010", the first address is "1", and the second address is a part other than the first address "1" in the destination address "11010", that is, the second address is "1010". A value of a $2^{nd}$ bit in the second address is 0, that is, a bit whose value is 0 exists in other bits other than the least significant bit in the second address. The first node A obtains the fourth address, where the fourth address is first two bits in the second address "1010", the fourth address is "10", a value of a least significant bit in the fourth address "10" is 0, and a value of a previous bit in the fourth address is 1. The third address includes the first address "1" and the fourth address "10", that is, the third address is "110". The first node A determines that the next-hop node of the first message is a node corresponding to the third address "110", that is, the node B1.

Step 605: The first node sends the first message to the determined next-hop node.

The next-hop node receives the first message, uses the next-hop node as the first node, and performs the operations of step 601 to step 605.

In this embodiment of this disclosure, the first node receives the first message, where the first message includes the destination address, the destination address includes x bits, and x is an integer greater than 0. The first node determines a next-hop node of the first message based on an address of the first node and the destination address, where the address of the first node includes y bits, and y is an integer greater than 0. Because the first node determines the next-hop node of the first message based on the address of the first node and the destination address, a supported format of the destination address is as follows: high-order m bits of the destination address are an address of a parent node of a second node corresponding to the destination address, and m is an integer greater than 0 and less than x. The destination address in this format is assigned by a node that the second node requests to access. In this way, the address assignment function is distributed on different non-leaf nodes in the network, and a server dedicated to address assignment does not need to be separately disposed, thereby reducing address assignment costs. In addition, a distance between the second node and the node accessed by the second node is usually relatively short. In this way, network resources consumed during address assignment can be reduced.

Figure 8:
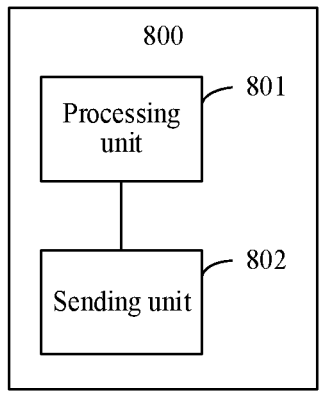
FIG. 8 is a schematic diagram of a structure of an address assignment apparatus according to an embodiment of this disclosure.

Refer to FIG. 8. An embodiment of this disclosure provides an address assignment apparatus 800. The apparatus 800 is deployed on the non-leaf node provided in the foregoing embodiments, for example, deployed on the non-leaf node in the network architecture 100 shown in FIG. 1, FIG. 3, or FIG. 5, deployed on the first node in the method 200 shown in FIG. 2, or deployed on the first node in the method 400 shown in FIG. 4. The apparatus 800 includes: a processing unit 801, configured to obtain an address of a second node based on an address of the apparatus 800, where the address of the apparatus 800 includes m bits, the address of the second node includes m+n bits, high-order m bits of the address of the second node are the same as low-order m bits of the address of the apparatus 800, and m and n each are an integer greater than 0; and a sending unit 802, configured to send the address of the second node to the second node.

Optionally, for a detailed process in which the processing unit 801 obtains the address of the second node, refer to related content of step 202 and step 203 in the method 200 shown in FIG. 2 or step 402 and step 403 in the method 400 shown in FIG. 4. Details are not described herein again.

Optionally, the second node can assign an address if low-order n bits of the address of the second node meet a condition for allowing a node to assign an address.

The second node cannot assign an address if the low-order n bits of the address of the second node meet a condition for prohibiting a node from assigning an address.

Optionally, the condition for allowing a node to assign an address includes a first condition and/or a second condition.

The second node can assign an address if first p bits of the low-order n bits of the address of the second node meet the first condition, where p is an integer greater than 0; or the second node can assign an address if first n−1 bits and a last bit of the low-order n bits of the address of the second node meet the second condition.

Optionally, the first condition is that n=p and p is a specified integer, and the second condition is that values of the first n−1 bits are all 1 and a value of the last bit is 0.

Optionally, the condition for prohibiting a node from assigning an address includes a third condition, a fourth condition, and/or a fifth condition. The second node cannot assign an address if first p bits of the low-order n bits of the address of the second node meet the third condition; the second node cannot assign an address if a length of the low-order n bits of the address of the second node meets the fourth condition; or the second node cannot assign an address if first n−1 bits and a last bit of the low-order n bits of the address of the second node meet the fifth condition.

Optionally, the third condition is that n is greater than p, p is a specified integer, and the first p bits are a specified address, the fourth condition is that the length of the low-order n bits of the address of the second node is less than a specified integer, and the fifth condition is that values of the first n−1 bits are all 1 and a value of the last bit is 1.

Optionally, the sending unit 802 is configured to send a first message to the second node, where the first message includes a field whose length is equal to x bytes, the field carries the address of the second node, and x is an integer greater than 0.

Optionally, the processing unit 801 is further configured to select one idle address from a first address pool as the low-order n bits of the address of the second node; and the apparatus 800 includes the first address pool, a quantity of bits included in each address in the first address pool is equal to p, p is a specified integer greater than 0, and n=p.

Optionally, for a detailed process in which the processing unit 801 selects one idle address from the first address pool as the low-order n bits of the address of the second node, refer to related content of step 202 in the method 200 shown in FIG. 2 or step 402 in the method 400 shown in FIG. 4. Details are not described herein again.

Optionally, the processing unit 801 is configured to select one idle address from the first address pool as the low-order n bits of the address of the second node when a type of the second node is a non-leaf node.

Optionally, for a detailed process in which the processing unit 801 selects one idle address from the first address pool as the low-order n bits of the address of the second node, refer to related content of step 202 in the method 200 shown in FIG. 2 or step 402 in the method 400 shown in FIG. 4. Details are not described herein again.

Optionally, the processing unit 801 is further configured to: select one idle address from a second address pool as the low-order n bits of the address of the second node when the first address pool does not include the idle address; and the first apparatus 800 includes the second address pool, the second address pool includes a first-type address and/or a second-type address, a quantity of bits included in the first-type address is less than p, a quantity of bits included in the second-type address is greater than p, and first p bits of the second-type address are a specified address in the first address pool.

Optionally, for a detailed process in which the processing unit 801 selects one idle address from the second address pool as the low-order n bits of the address of the second node, refer to related content of step 202 in the method 200 shown in FIG. 2 or step 402 in the method 400 shown in FIG. 4. Details are not described herein again.

Optionally, the processing unit 801 is further configured to: select one idle address from a second address pool as the low-order n bits of the address of the second node when a type of the second node is a leaf node, where the second address pool includes a first-type address and/or a second-type address, a quantity of bits included in the first-type address is less than p, a quantity of bits included in the second-type address is greater than p, first p bits of the second-type address are a specified address, and p is a specified integer greater than 0.

Optionally, for a detailed process in which the processing unit 801 selects one idle address from the second address pool as the low-order n bits of the address of the second node, refer to related content of step 202 in the method 200 shown in FIG. 2 or step 402 in the method 400 shown in FIG. 4. Details are not described herein again.

Optionally, the apparatus 800 is a parent node of the second node.

Optionally, the processing unit 801 is further configured to request to assign a first address, where the first address is the address of the apparatus.

Optionally, the processing unit 801 is further configured to update high-order m bits of an address of each node in a node set to the first address, where the node set includes a subnode of the apparatus 800.

Optionally, for a detailed process in which the processing unit 801 updates the high-order m bits of the address of each node in the node set to the first address, refer to related content of step 204 in the method 200 shown in FIG. 2 or step 404 in the method 400 shown in FIG. 4. Details are not described herein again.

In this embodiment of this disclosure, the processing unit obtains the address of the second node based on the address of the apparatus, where the address of the apparatus includes m bits, the address of the second node includes m+n bits, high-order m bits of the address of the second node are the same as low-order m bits of the address of the apparatus, and m and n each are an integer greater than 0. The address of the apparatus includes m bits, the address of the second node includes m+n bits, and the high-order m bits of the address of the second node are the same as the low-order m bits of the address of the apparatus. Therefore, the processing unit uses the address of the apparatus as high-order bits when assigning an address, and adds low-order n bits to this basis, to obtain the address of the second node. In this way, the second node may be a subnode of the apparatus, and the processing unit assigns an address to the subnode of the apparatus. Therefore, the address assignment function is distributed on different non-leaf nodes in a network, and a server dedicated to address assignment does not need to be separately disposed, thereby reducing address assignment costs. In addition, a distance between the subnode of the apparatus and the apparatus is usually relatively short. In this way, network resources consumed during address assignment can be reduced.

Figure 9:
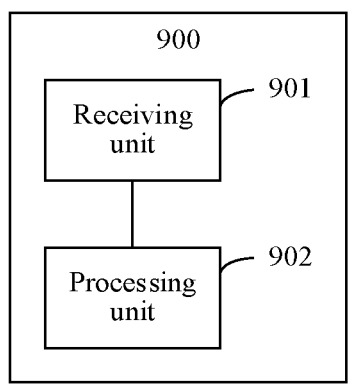
FIG. 9 is a schematic diagram of a structure of a node determining apparatus according to an embodiment of this disclosure.

Refer to FIG. 9. An embodiment of this disclosure provides a node determining apparatus 900. The apparatus 900 is deployed on the non-leaf node provided in the foregoing embodiments, for example, deployed on the non-leaf node in the network architecture 100 shown in FIG. 1, FIG. 3, or FIG. 5, or deployed on the first node in the method 600 shown in FIG. 6. The apparatus 900 includes: a receiving unit 901, configured to receive a first message, where the first message includes a destination address, the destination address includes x bits, and x is an integer greater than 0; and a processing unit 902, configured to determine a next-hop node of the first message based on an address of the apparatus 900 and the destination address, where the address of the apparatus 900 includes y bits, and y is an integer greater than 0.

Optionally, for a detailed process in which the processing unit 901 determines the next-hop node of the first message, refer to related content of step 602 to step 604 in the method 600 shown in FIG. 6. Details are not described herein again.

Optionally, the processing unit 902 is configured to determine, when x is less than y, that the next-hop node of the first message is a parent node of the apparatus 900.

Optionally, the processing unit 902 is configured to determine the next-hop node of the first message based on the address of the apparatus 900 and a first address when x is greater than or equal to y, where the first address is high-order y bits of the destination address.

Optionally, for a detailed process in which the processing unit 901 determines the next-hop node of the first message based on the address of the apparatus 900 and the first address, refer to related content of step 604 in the method 600 shown in FIG. 6. Details are not described herein again.

Optionally, the processing unit 902 is configured to determine, when the address of the apparatus 900 is different from the first address, that the next-hop node of the first message is the parent node of the apparatus 900.

Optionally, the processing unit 902 is configured to determine the next-hop node of the first message based on a second address when the address of the apparatus 900 is the same as the first address and x is greater than y, where the second address is a part of the destination address other than the first address.

Figure 7:
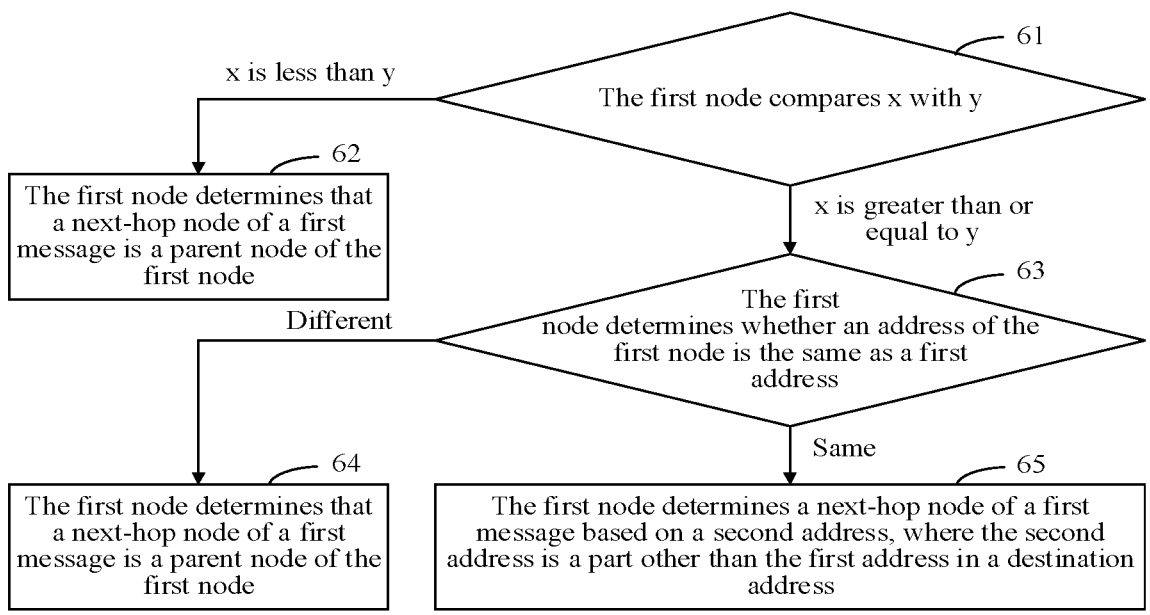
FIG. 7 is a flowchart of a method for determining a next-hop node according to an embodiment of this disclosure.

Optionally, for a detailed process in which the processing unit 901 determines the next-hop node of the first message based on the second address, refer to related content of operation 65 in the method 600 shown in FIG. 7. Details are not described herein again.

Optionally, the processing unit 902 is configured to: when a quantity of bits included in the second address is less than or equal to p or first p bits of the second address are a specified address, a node corresponding to the destination address is a child node of the apparatus 900; and determine that the next-hop node of the first message is the child node corresponding to the destination address, where p is a specified integer greater than 0; or when a quantity of bits included in the second address is greater than p and first p bits of the second address are not a specified address, determine that the next-hop node of the first message is a node corresponding to a third address, where the third address includes the first address and the first p bits of the second address.

Optionally, the processing unit 902 is configured to: when a value of each bit included in the second address is 1, or when a value of a least significant bit in the second address is 0 and a value of each of other bits other than the least significant bit in the second address is 1, a node corresponding to the destination address is a child node of the apparatus 900; and determine that the next-hop node of the first message is the child node corresponding to the destination address.

Optionally, the processing unit 900 is configured to: obtain a fourth address when a bit whose value is 0 exists in other bits other than the least significant bit in the second address, where the fourth address is first z bits of the second address, z is an integer greater than 0, a value of a least significant bit of the fourth address is 0, and values of first z−1 bits of the fourth address are all 1; and determine that the next-hop node of the first message is a node corresponding to a third address, where the third address includes the first address and the fourth address.

Optionally, the processing unit 902 is further configured to process the first message when the address of the apparatus 900 is the same as the first address and x=y.

Optionally, high-order m bits of the destination address are the same as an address of a parent node of the second node, the second node is a node corresponding to the destination address, and m is an integer greater than 0 and less than x.

In this embodiment of this disclosure, the receiving unit receives the first message, where the first message includes a destination address, the destination address includes x bits, and x is an integer greater than 0. The processing unit determines a next-hop node of the first message based on an address of the apparatus and the destination address, where the address of the apparatus includes y bits, and y is an integer greater than 0. Because the next-hop node of the first message is determined based on the address of the apparatus and the destination address, a supported format of the destination address is as follows: the highest-order m bits of the destination address are an address of a parent node of the second node corresponding to the destination address, and m is an integer greater than 0 and less than x. The destination address in this format is assigned by a node that the second node requests to access. In this way, the address assignment function is distributed on different non-leaf nodes in the network, and a server dedicated to address assignment does not need to be separately disposed, thereby reducing address assignment costs. In addition, a distance between the second node and the node accessed by the second node is usually relatively short. In this way, network resources consumed during address assignment can be reduced.

Figure 10:
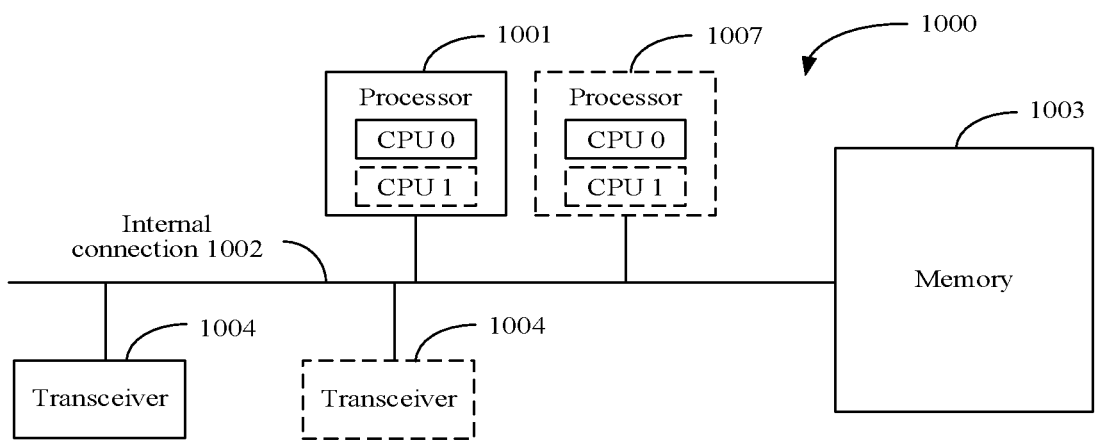
FIG. 10 is a schematic diagram of a structure of another address assignment apparatus according to an embodiment of this disclosure.

FIG. 10 is a schematic diagram of an address assignment apparatus 1000 according to an embodiment of this disclosure. The apparatus 1000 is the non-leaf node provided in the foregoing embodiments, for example, the non-leaf node in the network architecture 100 shown in FIG. 1, FIG. 3, or FIG. 5, the first node in the method 200 shown in FIG. 2, or the first node in the method 400 shown in FIG. 4. The apparatus 1000 includes at least one processor 1001, an internal connection 1002, a memory 1003, and at least one transceiver 1004.

The apparatus 1000 is an apparatus of a hardware structure, and can be configured to implement the functional modules in the apparatus 800 shown in FIG. 8. For example, a person skilled in the art may figure out that the processing unit 801 in the apparatus 800 shown in FIG. 8 may be implemented by using the at least one processor 1001 by invoking code in the memory 1003, and the sending unit 802 in the apparatus 800 shown in FIG. 8 may be implemented by using the transceiver 1004.

Optionally, the apparatus 1000 may be further configured to implement a function of the first node in any one of the foregoing embodiments.

Optionally, the processor 1001 may be a general-purpose central processing unit (CPU), a network processor (NP), a microprocessor, an application-specific integrated circuit (ASIC), or one or more integrated circuits configured to control program execution of solutions of this disclosure.

The internal connection 1002 may include a path for transmitting information between the foregoing components. Optionally, the internal connection 1002 is a board, a bus, or the like.

The transceiver 1004 is configured to communicate with another device or a communication network.

The memory 1003 may be a read-only memory (ROM) or another type of static storage device that can store static information and instructions, or a random-access memory (RAM) or another type of dynamic storage device that can store information and instructions, or may be an electrically erasable programmable read-only memory (EEPROM), a compact disc read-only memory (CD-ROM) or other compact disc storage, optical disc storage (including a compact disc (CD), a laser disc, an optical disc, a digital versatile disc (DVD), a BLU-RAY disc, and the like), a magnetic disk storage medium or another magnetic storage device, or any other medium that can be used to carry or store expected program code in an instruction form or a data structure form and that can be accessed by a computer. However, the memory 1003 is not limited thereto. The memory may exist independently and is connected to the processor through the bus. The memory may alternatively be integrated with the processor.

The memory 1003 is configured to store application program code for performing the solutions of this disclosure, and the processor 1001 controls the execution. The processor 1001 is configured to execute the application program code stored in the memory 1003, and cooperate with the at least one transceiver 1004, so that the apparatus 1000 implements functions in the method in this patent.

During specific implementation, in an embodiment, the processor 1001 may include one or more CPUs, for example, a CPU 0 and a CPU 1 in FIG. 10.

During specific implementation, in an embodiment, the apparatus 1000 may include a plurality of processors, for example, the processor 1001 and a processor 1007 in FIG. 10. Each of the processors may be a single-core (single-CPU) processor, or may be a multi-core (multi-CPU) processor. The processor herein may be one or more devices, circuits, and/or processing cores configured to process data (for example, computer program instructions).

Figure 11:
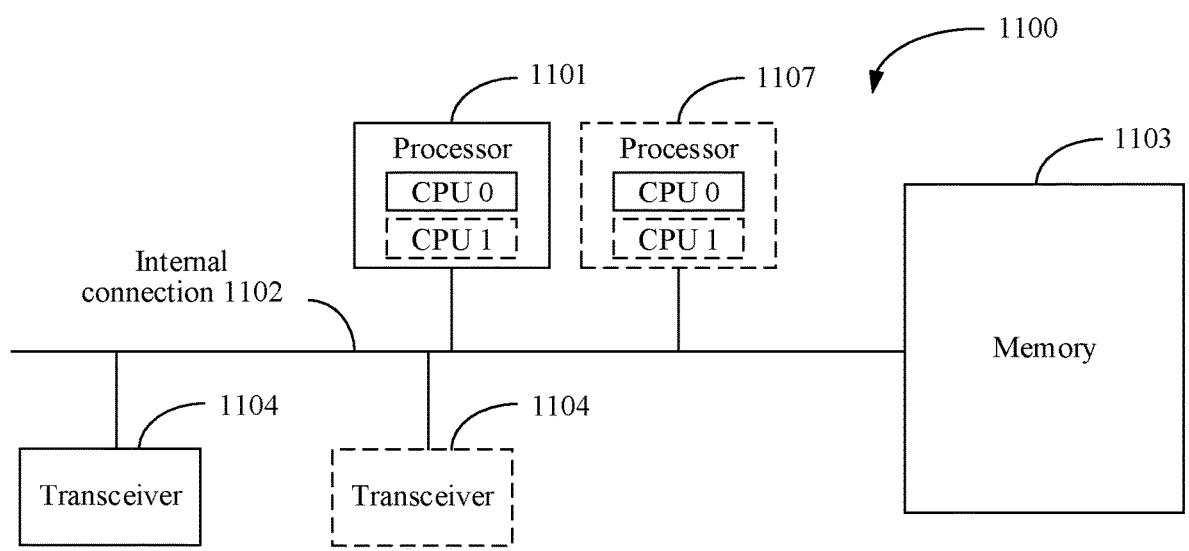
FIG. 11 is a schematic diagram of a structure of another node determining apparatus according to an embodiment of this disclosure.

FIG. 11 is a schematic diagram of a node determining apparatus 1100 according to an embodiment of this disclosure. The apparatus 1100 is the non-leaf node provided in the foregoing embodiments, for example, the non-leaf node in the network architecture 100 shown in FIG. 1, FIG. 3, or FIG. 5, or the first node in the method 600 shown in FIG. 6. The apparatus 1100 includes at least one processor 1101, an internal connection 1102, a memory 1103, and at least one transceiver 1104.

The apparatus 1100 is an apparatus of a hardware structure, and can be configured to implement the functional modules in the apparatus 900 shown in FIG. 9. For example, a person skilled in the art may figure out that the processing unit 902 in the apparatus 900 shown in FIG. 9 may be implemented by using the at least one processor 1101 by invoking code in the memory 1103, and the receiving unit 901 in the apparatus 900 shown in FIG. 9 may be implemented by using the transceiver 1104.

Optionally, the apparatus 1100 may be further configured to implement a function of the first node in any one of the foregoing embodiments.

Optionally, the processor 1101 may be a general-purpose CPU, an NP, a microprocessor, an ASIC, or one or more integrated circuits configured to control program execution of solutions of this disclosure.

The internal connection 1102 may include a path for transmitting information between the foregoing components. Optionally, the internal connection 1102 is a board, a bus, or the like.

The transceiver 1104 is configured to communicate with another device or a communication network.

The memory 1103 may be a ROM or another type of static storage device that can store static information and instructions, or a RAM or another type of dynamic storage device that can store information and instructions; or may be an EEPROM, a CD-ROM or another optical disc storage, an optical disc storage (including a compact optical disc, a laser disc, an optical disc, a DVD, a BLU-RAY disc, or the like), a magnetic disk storage medium or another magnetic storage device, or any other medium that can be configured to carry or store expected program code in a form of instructions or a data structure and that can be accessed by a computer, but is not limited thereto. The memory may exist independently and is connected to the processor through the bus. The memory may alternatively be integrated with the processor.

The memory 1103 is configured to store application program code for performing the solutions of this disclosure, and the processor 1101 controls the execution. The processor 1101 is configured to execute the application program code stored in the memory 1103, and cooperate with the at least one transceiver 1104, so that the apparatus 1100 implements functions in the method in this patent.

During specific implementation, in an embodiment, the processor 1101 may include one or more CPUs such as a CPU 0 and a CPU 1 in FIG. 11.

During specific implementation, in an embodiment, the apparatus 1100 may include a plurality of processors, for example, the processor 1101 and a processor 1107 in FIG. 11. Each of the processors may be a single-core (single-CPU) processor, or may be a multi-core (multi-CPU) processor. The processor herein may be one or more devices, circuits, and/or processing cores configured to process data (for example, computer program instructions).

A person of ordinary skill in the art may understand that all or some of the steps of the embodiments may be implemented by hardware or a program instructing related hardware. The program may be stored in a computer-readable storage medium. The storage medium may be a ROM, a magnetic disk, an optical disc, or the like.

The foregoing descriptions are only optional embodiments of this disclosure, but are not intended to limit this disclosure. Any modification, equivalent replacement, or improvement made within the principle of this disclosure should fall within the protection scope of this disclosure.

What is claimed is:

1. A method, comprising:
obtaining, by a first node and based on a first address of the first node, a second address of a second node, wherein the first address comprises m low-order bits, wherein the second address comprises m+n bits, wherein m first high-order bits of the second address are the same as the m low-order bits of the first address, and wherein m and n are integers greater than 0; and
sending, by the first node and to the second node, the second address.

2. The method of claim 1, wherein sending the second address comprises sending, by the first node and to the second node, a first message, wherein the first message comprises a field having a length of x bytes, wherein the field carries the second address, and wherein x is an integer greater than 0.

3. The method of claim 1, further comprising selecting, by the first node and from a first address pool, one idle address as n low-order bits of the second address when the first address pool comprises the one idle address, wherein the first node comprises the first address pool, wherein a quantity of bits comprised in each address in the first address pool is equal to p, wherein p is a specified integer greater than 0, and wherein n=p.

4. The method of claim 3, wherein selecting the one idle address comprises selecting, by the first node, the one idle address when a type of the second node is a non-leaf node.

5. The method of claim 3, further comprising selecting, by the first node and from a second address pool, the one idle address as the n low-order bits when the first address pool does not comprise the idle address, wherein the first node comprises the second address pool, wherein the second address pool comprises a first-type address or a second-type address, wherein a first quantity of bits comprised in the first-type address is less than p, wherein a second quantity of bits comprised in the second-type address is greater than p, and wherein p first bits of the second-type address are a specified address in the first address pool.

6. The method of claim 1, further comprising selecting, by the first node and from a second address pool, one idle address as n low-order bits of the second address when a type of the second node is a leaf node, wherein the second address pool comprises a first-type address or a second-type address, wherein a first quantity of bits comprised in the first-type address is less than p, wherein a second quantity of bits comprised in the second-type address is greater than p, wherein p first bits of the second-type address are a specified address, and wherein p is a specified integer greater than 0.

7. The method of claim 1, wherein the first node is a parent node of the second node.

8. The method of claim 1, further comprising requesting, by the first node, to assign a third address, wherein the third address is the first address.

9. The method of claim 8, further comprising updating, by the first node, second m high-order bits of a fourth address of each node in a node set to the third address, wherein the node set comprises a subnode of the first node.

10. An apparatus, comprising:
a memory configured to store instructions; and
one or more processors coupled to the memory and configured to execute the instructions to:
obtain, based on a first address of the apparatus, a second address of a second node, wherein the first address comprises m low-order bits, wherein the second address comprises m+n bits, wherein m high-order bits of the second address are the same as the m low-order bits of the first address, and wherein m and n are integers greater than 0; and
send, to the second node, the second address.

11. The apparatus of claim 10, wherein the one or more processors are further configured to execute the instructions to further send, to the second node, a first message, wherein the first message comprises a field having a length of x bytes, wherein the field carries the second address, and wherein x is an integer greater than 0.

12. The apparatus of claim 10, wherein the one or more processors are further configured to execute the instructions to select, from a first address pool, one idle address as n low-order bits of the second address when the first address pool comprises the one idle address, wherein the apparatus comprises the first address pool, wherein a quantity of bits comprised in each address in the first address pool is equal to p, wherein p is a specified integer greater than 0, and wherein n=p.

13. The apparatus of claim 12, wherein the one or more processors are further configured to further select the one idle address when a type of the second node is a non-leaf node.

14. The apparatus of claim 12, wherein the one or more processors are further configured to select, from a second address pool, the one idle address as the n low-order bits when the first address pool does not comprise the idle address, wherein the apparatus comprises the second address pool, wherein the second address pool comprises a first-type address or a second-type address, wherein a first quantity of bits comprised in the first-type address is less than p, wherein a second quantity of bits comprised in the second-type address is greater than p, and wherein p first bits of the second-type address are a specified address in the first address pool.

15. The apparatus of claim 10, wherein the one or more processors are further configured to select, from a second address pool, one idle address as n low-order bits of the second address when a type of the second node is a leaf node, wherein the second address pool comprises a first-type address or a second-type address, wherein a first quantity of bits comprised in the first-type address is less than p, wherein a second quantity of bits comprised in the second-type address is greater than p, wherein p first bits of the second-type address are a specified address, and wherein p is a specified integer greater than 0.

16. A computer program product comprising instructions that are stored on a non-transitory computer-readable storage medium and that, when executed by one or more processors, cause a first node to:
obtain, based on a first address of the first node, a second address of a second node, wherein the first address comprises m low-order bits, wherein the second address comprises m+n bits, wherein m first high-order bits of the second address are the same as the m low-order bits of the first address, and wherein m and n are integers greater than 0; and
send, to the second node, the second address.

17. The computer program product of claim 16, wherein the one or more processors are further configured to execute the instructions to cause the first node to send the second address by sending, to the second node, a first message, wherein the first message comprises a field having a length of x bytes, wherein the field carries the second address, and wherein x is an integer greater than 0.

18. The computer program product of claim 16, wherein the one or more processors are further configured to execute the instructions to cause the first node to select, from a first address pool, one idle address as n low-order bits of the second address when the first address pool comprises the one idle address, wherein the first node comprises the first address pool, wherein a quantity of bits comprised in each address in the first address pool is equal to p, wherein p is a specified integer greater than 0, and wherein n=p.

19. The computer program product of claim 18, wherein the one or more processors are further configured to execute the instructions to cause the first node to select the one idle address by selecting the one idle address when a type of the second node is a non-leaf node.

20. The computer program product of claim 18, wherein the one or more processors are further configured to execute the instructions to cause the first node to select, from a second address pool, the one idle address as the n low-order bits when the first address pool does not comprise the idle address, wherein the first node comprises the second address pool, wherein the second address pool comprises a first-type address or a second-type address, wherein a first quantity of bits comprised in the first-type address is less than p, wherein a second quantity of bits comprised in the second-type address is greater than p, and wherein p first bits of the second-type address are a specified address in the first address pool.

21. The computer program product of claim 16, wherein the one or more processors are further configured to execute the instructions to cause the first node to select, from a second address pool, one idle address as n low-order bits of the second address when a type of the second node is a leaf node, wherein the second address pool comprises a first-type address or a second-type address, wherein a first quantity of bits comprised in the first-type address is less than p, wherein a second quantity of bits comprised in the second-type address is greater than p, wherein p first bits of the second-type address are a specified address, and wherein p is a specified integer greater than 0.

22. The computer program product of claim 16, wherein the first node is a parent node of the second node.

23. The computer program product of claim 16, wherein the one or more processors are further configured to execute the instructions to cause the first node to request to assign a third address, and wherein the third address is the first address.

24. The computer program product of claim 23, wherein the one or more processors are further configured to execute the instructions to cause the first node to update second m high-order bits of a fourth address of each node in a node set to the third address, and wherein the node set comprises a subnode of the first node.

* * * * *